(12) United States Patent
Kanatani et al.

(10) Patent No.: US 10,818,254 B2
(45) Date of Patent: Oct. 27, 2020

(54) DISPLAY DEVICE AND METHOD OF DRIVING DISPLAY DEVICE

(71) Applicant: SHARP KABUSHIKI KAISHA, Sakai, Osaka (JP)

(72) Inventors: Toshiki Kanatani, Sakai (JP); Kohji Ueno, Sakai (JP); Shinji Sadamitsu, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 164 days.

(21) Appl. No.: 16/311,118

(22) PCT Filed: Jul. 20, 2017

(86) PCT No.: PCT/JP2017/026216
§ 371 (c)(1),
(2) Date: Dec. 18, 2018

(87) PCT Pub. No.: WO2018/021131
PCT Pub. Date: Feb. 1, 2018

(65) Prior Publication Data
US 2020/0312258 A1 Oct. 1, 2020

(30) Foreign Application Priority Data
Jul. 27, 2016 (JP) ................. 2016-146999

(51) Int. Cl.
*G09G 3/36* (2006.01)
(52) U.S. Cl.
CPC ... *G09G 3/3659* (2013.01); *G09G 2310/0213* (2013.01); *G09G 2310/0251* (2013.01)
(58) Field of Classification Search
CPC . G02F 1/133; G09G 3/20; G09G 3/36; G09G 3/3291; G09G 3/3685; G09G 2310/0297
See application file for complete search history.

(56) References Cited

U.S. PATENT DOCUMENTS

2002/0075218 A1* 6/2002 Makishima .......... G09G 3/3677 345/90
2009/0015577 A1 1/2009 Nishimoto et al.
2009/0021509 A1* 1/2009 Lee .................... G09G 3/3677 345/213

FOREIGN PATENT DOCUMENTS

JP H10-268261 A 10/1998
JP 2002-062518 A 2/2002
(Continued)

*Primary Examiner* — Nelson M Rosario
(74) *Attorney, Agent, or Firm* — ScienBiziP, P.C.

(57) ABSTRACT

The present application discloses an active matrix type display device that is capable of successfully displaying an image by an intra-screen division drive while suppressing the complication of a circuit configuration. In a liquid crystal panel that includes an A area and a B area, an A area scanning signal line and a B area scanning signal line are scanned in the same direction, and the A area data signal line and the B area data signal line are driven based on an A area image signal DaA and a B area image signal DaB, respectively, that are obtained from an image signal DA from the outside. Furthermore, when a scanning signal line that is to be selected latest in the A area is selected, a voltage that is the same as a data signal voltage which is applied to the A area data signal line that intersects the scanning signal line is applied to the B area data signal line that is paired with the A area data signal line. Moreover, for the purpose of suitable preliminary charging with an intra-screen division drive, a voltage for the preliminary charging is applied to a data signal line in each of the A area and the B area, immediately before a data signal is applied to a head data signal line in each of the A area and the B area.

7 Claims, 10 Drawing Sheets

(56) References Cited

FOREIGN PATENT DOCUMENTS

| | | |
|---|---|---|
| JP | 2007-225898 A | 9/2007 |
| JP | 2009-020184 A | 1/2009 |

\* cited by examiner

DISPLAY DEVICE AND METHOD OF DRIVING DISPLAY DEVICE

TECHNICAL FIELD

The present invention relates to a display device, such as an active matrix type liquid crystal display device, and more particularly to an active matrix type display device that is configured in such a manner as to divide a display unit into a plurality of areas (sub-display units) and drive the plurality of areas at the same time, and a method of driving the active matrix type display device.

BACKGROUND ART

An active matrix type liquid crystal display device includes a plurality of data signal lines, a plurality of scanning signal lines that intersect the plurality of data signal lines and a plurality of pixel formation units that are positioned in a matrix form in a manner that corresponds to the plurality of data signal lines and the plurality of scanning signal lines. Each pixel formation unit includes a pixel capacitance and a switching element. Here, as the switching element, normally, a thin film transistor (hereinafter referred to as a "TFT") is used. The pixel capacitance in each pixel formation unit is formed with a pixel electrode and a common electrode (also referred to as a "counter electrode") that faces the pixel electrode with liquid crystal being interposed in between. The pixel electrode is connected to a corresponding data signal line via the TFT as the switching element described above, and a corresponding scanning signal line is connected to a gate terminal of the TFT.

In the above-described active matrix type display device, in association with enhancement in high definition of a display image and the like, when the time that can be allocated for writing (charging of the pixel capacitance by each data signal in the case of the liquid crystal display device) pixel data to each pixel formation unit in a display unit decreases, pixel data is not sufficiently written to each pixel formation unit. Thus, in some cases, a reduction in display quality is brought about. In contrast, active matrix type display devices, each of which is configured such that although progress has been made in enhancement in high definition of a display image, the pixel data can be sufficiently written and such that the display unit is divided into a plurality of sub-display units and the plurality of sub-display units are driven at the same time, have been proposed to this in the past (a drive scheme in which this configuration employed is hereinafter referred to as an "intra-screen division drive scheme"). For example, active matrix type liquid crystal display devices, each of which is configured such that a display unit is divided in an upward-downward direction to electrically separate each data signal line into upper and lower portions, that a data signal line drive circuit is provided on each of the upper end side and the lower end side of the display unit, and that an upper half portion and a lower half portion of the display unit are driven at the same time, have been known.

CITATION LIST

Patent Literature

PTL 1: Japanese Unexamined Patent Application Publication No. 2007-225898
PTL 2: Japanese Unexamined Patent Application Publication No. 2002-62518
PTL 3: Japanese Unexamined Patent Application Publication No. 10-268261

SUMMARY OF INVENTION

Technical Problem

In the display device in compliance with the intra-screen division drive scheme, as described above, although a plurality of sub-display units in the display unit are displayed in the same gradation, in some cases, a difference in display luminance occurs in border portions of adjacent sub-display units. Furthermore, in a case where a moving image is displayed on the display device described above, in some cases, falling of frames takes place in the border portions and thus the moving image is not smoothly displayed.

In contrast, a liquid crystal display device that is disclosed in PTL 1, scanning electrodes are divided into a plurality of scanning electrode groups, and one scanning line group and any other scanning line group that are adjacent to each other are sequentially scanned in opposite directions during the same duration and are driven. For example, in a configuration in which the scanning electrodes (scanning signal lines) in the liquid crystal display device are divided into two groups, a scanning electrode group 7 and a scanning electrode group 8 and in which signal electrodes (data signal lines) that each intersect the scanning electrode groups 7 and 8 in the liquid crystal display device, are divided into two groups, a signal electrode group 5 and a signal electrode group 6, the scanning electrode groups 7 and 8 and the signal electrode groups 5 and 6 are driven as follows. That is, the scanning electrode group 7 is selected and scanned linearly and successively upward from the center of a display unit, and the scanning electrode group 8 is selected and scanned linearly and successively downward from the center of the display unit. On the other hand, the signal electrode group 5 and the signal electrode group 6 are synchronized with scanning signals of the scanning electrode group 7 and the scanning electrode group 8 and data signal is assigned to the signal electrode group 5 and the signal electrode group 6.

With this drive scheme that is disclosed in PTL 1, a difference in luminance can be suppressed from occurring in border portions (border portions of adjacent sub-display units) of the scanning electrode group 7 and the scanning electrode group 8. Furthermore, because writing of pixel data to the border portions is performed at the same point in time or at approximately the same time, in a case where a moving image is displayed, the falling of frames can be suppressed from taking place and thus smooth display can be performed.

However, in the above-described drive, the scanning of the scanning electrode group 7 and the scanning of the scanning electrode group 8 are opposite in direction, there is a need to assign data signals to the signal electrode groups 5 and 6 such that an order of the data signal assigned to the signal electrode group 5 and an order of the data signal assigned to the signal electrode group 6 are reversed. For this reason, a circuit configuration for driving the signal electrode is complicated.

On the other hand, in PTL 3, an invention directed to an intra-screen division drive type liquid crystal display device in which a screen is vertically divided and is driven is described, and a configuration, in which an upper screen and a lower screen are scanned in the same direction and the scanning of the lower screen is performed in a manner that is delayed by one frame to the upper screen, is disclosed as an implementation example of the invention (refer to Paragraph [0068] and FIG. 20(b) in PTL 3). However, the configuration according to the implementation example, although set to be effective at the smooth display of the moving image, cannot effectively suppress the difference in luminance from occurring in border portions of the upper screen and the lower screen.

At this point, it is desirable to provide an active matrix type display device that is capable of successfully display an image by intra-screen division drive while suppressing complication of a circuit configuration, and a method of driving the active matrix type display device.

Solution to Problem

According to a first aspect of the present invention, there is provided a display device that includes a plurality of data signal lines, a plurality of scanning signal lines that intersect the plurality of data signal lines, respectively, and a plurality of pixel formation units that are positioned in a matrix form in a manner that corresponds to the plurality of data signal lines and the plurality of scanning signal lines, the device including:

a scanning signal line drive circuit that divides the plurality of scanning signal lines into two or more sets of scanning signal line groups, a set including a predetermined number of scanning signal lines, and that drives the two or more sets of scanning signal line groups in parallel such that the scanning signal lines that constitute each set are sequentially selected in an identical direction;

a data signal line drive circuit that applies a plurality of data signals which represent an image that is to be displayed, to the plurality of data signal lines; and a display control circuit that controls the scanning signal line drive circuit and the data signal line drive circuit such that the plurality of data signals are applied to the plurality of data signal lines in accordance with the sequential selection of the scanning signal lines that constitute each set, in which each data signal line is electrically separated into two or more subsidiary data signal lines that each intersect the two or more sets of scanning signal line groups such that a portion of the data signal line, which intersects one set of scanning signal line group, constitutes the subsidiary data signal line as one conductor, in which, before a scanning signal line that is to be selected latest among each set of the scanning signal line group is selected, the display control circuit controls the scanning signal line drive circuit such that sequential selection of scanning signal line groups in a set that succeeds the set is ended, and in which, when, in accordance with parallel driving of the two or more sets of scanning signal line groups, the plurality of data signal lines are driven independently for every subsidiary data signal line that intersects a scanning signal line group in an identical set and the scanning signal line that is to be selected latest among each set of the scanning signal line group is selected, the display control circuit controls the data signal line drive circuit such that a voltage which is as high as a voltage of a data signal, which is applied to the subsidiary data signal line that intersects the set of the scanning signal line group, is applied to each of the subsidiary data signal lines that intersect the scanning signal line groups in the set that succeeds the set.

According to a second aspect of the present invention, in the first aspect of the present invention, each pixel formation unit includes a capacitance element, to which a voltage of a data signal which is applied to a corresponding subsidiary data signal line when a corresponding scanning signal line is selected is applied, and which retains the applied voltage as pixel data, the display control circuit controls the scanning signal line drive circuit such that a corresponding scanning signal line is selected in a preliminary charging duration that is set in advance as a duration that precedes a primary charging duration in which the corresponding scanning signal line is selected in order to assign the pixel data to each pixel formation unit, and the display control circuit controls the data signal line drive circuit such that a voltage, which is to be applied, as a data signal, to each subsidiary data signal line in the primary charging duration for the scanning signal line, for which the preliminary charging duration is set earlier than the primary charging duration for a scanning signal line that is to be selected earliest among each set of the scanning signal line group, is also applied in the preliminary charging duration.

According to a third aspect of the present invention, in the first or second aspect of the present invention, the plurality of scanning signal lines are made up of two sets of a preceding scanning signal line group and a succeeding scanning signal line group, the data signal line drive circuit includes
a preceding data signal line drive circuit that drives a subsidiary data signal line which intersects the preceding scanning signal line group, among the subsidiary data signal lines that are included in the plurality of data signal lines, and
a succeeding data signal line drive circuit that drives a subsidiary data signal line which intersects the succeeding scanning signal line group, among the subsidiary data signal lines that are included in the plurality of data signal lines, the display control circuit causes the preceding data signal line drive circuit to generate a data signal that is to be applied to the subsidiary data signal line which intersects the preceding scanning signal line group, based on image data in a first half of each frame in an input signal that is assigned, as a signal representing the image that is to be displayed, from an outside, and the display control circuit causes the succeeding data signal line drive circuit to generate a data signal that is to be applied to the subsidiary data signal line which intersects the succeeding scanning signal line group, based on image data in a second half of a frame that immediately precedes a frame for the input signal which corresponds to the data signal that is to be applied to the subsidiary data signal line which intersects the preceding scanning signal line group.

According to a fourth aspect of the present invention, in the third aspect of the present invention, the display control circuit includes
a memory storable image data for one and a half frames, of an input signal, and
a memory control circuit that writes image data that is indicated by the input signal, to the memory such that the memory functions as a ring buffer, the memory control circuit reads image data that is equivalent to the first half of one frame for the input signal, at a speed that is half of a writing speed, from the memory, and supplies the image data to the preceding data signal line drive circuit, and concurrently with the reading of the image data equivalent to the first half of the one frame from the memory, the memory control circuit reads image data that is equivalent to the second half of a frame that immediately precedes the one frame, at the speed that is half of the writing speed from the memory, and supplies the image data to the succeeding data signal line drive circuit.

According to a fifth aspect of the present invention, there is provided a method of driving a display device that includes a plurality of data signal lines, a plurality of scanning signal lines that intersect the plurality of data signal lines and a plurality of pixel formation units that are positioned in a matrix form in a manner that corresponds to the plurality of data signal lines and the plurality of scanning signal lines, the method including:

a scanning signal line drive step of dividing the plurality of scanning signal lines into two or more sets of scanning signal line groups, a set including a predetermined number of scanning signal lines, and of driving the two or more sets of scanning signal line groups in parallel such that the scanning signal lines that constitute each set are sequentially selected in an identical direction; and a data signal line drive step of driving the plurality of data signal lines such that a plurality of data signals that represent an image that is to be displayed are applied to the plurality of data signal lines in accordance with the sequential selection of the scanning signal lines that constitute each set, in which each data signal line is electrically separated into two or more subsidiary data signal lines that each intersect the two or more sets of scanning signal line groups such that a portion of the data signal line, which intersects one set of scanning signal line group, constitutes the subsidiary data signal line as one conductor, in which, in the scanning signal line drive step, before a scanning signal line that is to be selected latest among each set of the scanning signal line group is selected, the plurality of scanning signal lines are driven such that sequential selection of scanning signal line groups in a set that succeeds the set is ended, and in which, in the data signal line drive step, when, in accordance with parallel driving of the two or more sets of scanning signal line groups, the plurality of data signal lines are driven independently for every subsidiary data signal line that intersects a scanning signal line group in an identical set and the scanning signal line that is to be selected latest among each set of the scanning signal line group is selected, a voltage which is as high as a voltage of a data signal, which is applied to the subsidiary data signal line that intersects the set of the scanning signal line group, is applied to each of the subsidiary data signal lines that intersect the scanning signal line groups in the set that succeeds the set.

According to a sixth aspect of the present invention, in the fifth aspect of the present invention, each pixel formation unit includes a capacitance element, to which a voltage of a data signal which is applied to a corresponding subsidiary data signal line when a corresponding scanning signal line is selected is applied, and which retains the applied voltage as pixel data, the scanning signal line drive step includes a step of selecting a corresponding scanning signal line in a preliminary charging duration that is set in advance as a duration that precedes a primary charging duration in which the corresponding scanning signal line is selected in order to assign the pixel data to each pixel formation unit, and the data signal line drive step includes a step in which a voltage, which is to be applied, as a data signal, to each subsidiary data signal line, in the primary charging duration for the scanning signal line for which the preliminary charging duration is set earlier than the primary charging duration for a scanning signal line that is to be selected earliest among each set of the scanning signal line group, is also applied in the preliminary charging duration.

According to a seventh aspect of the present invention, in the fifth or sixth aspect of the present invention, the plurality of scanning signal lines are made up of two sets of a preceding scanning signal line group and a succeeding scanning signal line group, the data signal line drive step includes
   a preceding data signal line drive step of driving a subsidiary data signal line which intersects the preceding scanning signal line group, among the subsidiary data signal lines that are included in the plurality of data signal lines, and
   a succeeding data signal line drive step of driving a subsidiary data signal line which intersects the succeeding scanning signal line group, among the subsidiary data signal lines that are included in the plurality of data signal lines, in the preceding data signal line drive step, a data signal that is to be applied to each subsidiary data signal line which intersects the preceding scanning signal line group is generated based on image data in a first half of each frame in an input signal that is assigned, as a signal representing the image that is to be displayed, from an outside, and in the succeeding data signal line drive step, a data signal that is to be applied to each subsidiary data signal line which intersects the succeeding scanning signal line group is generated based on image data in a second half of a frame that immediately precedes a frame for the input signal which corresponds to the data signal that is applied to each subsidiary data signal line which intersects the preceding scanning signal line group.

Other aspects of the present invention will be apparent from the aspects of the present invention and embodiments that will be described below, and thus descriptions thereof are omitted.

Advantageous Effects of Invention

According to the first aspect of the present invention, in the intra-screen division drive type display device in which two or more sets of scanning signal line groups are driven in parallel such that scanning signal lines which constitute each set are sequentially selected in the same direction, before a scanning signal line that is to be selected latest among each set of the scanning signal line group is selected, when sequential selection of a sequence of scanning signal line groups in a set that succeeds the set, is ended and a scanning signal line that is to be selected latest among each set of the scanning signal line group is selected, a voltage that is the same as a voltage of a data signal, which is applied to a subsidiary data signal line that intersects the scanning signal line group in the set, is applied to each of the subsidiary data signal lines that intersect the scanning signal line groups, respectively, in the set that succeeds the set. Accordingly, between a pixel formation unit that corresponds to the scanning signal line (the last scanning signal line in each set) which is to be selected latest among each set of the scanning signal line group and a pixel formation unit that corresponds to any other scanning signal line in the set, a difference in a data signal line voltage is suppressed from having an influence on a pixel voltage that is retained in each of these pixel formation units. As a result, among pixel formation units that correspond to each set of the scanning signal line group, a difference in luminance does not occur between a pixel formation unit that corresponds to the last scanning signal line and a pixel formation unit that corresponds to any other scanning signal line in the set, and a pseudo-line is suppressed from occurring in border portions of scanning signal line groups in adjacent two sets. Therefore, the scanning signal lines in each set are sequentially selected in the same direction, and thus a high definition image can be successfully displayed by intra-screen division drive while suppressing the complication in a circuit configuration.

According to the second aspect of the present invention, in the intra-screen division drive type display device in which two or more sets of scanning signal line groups are driven in parallel such that scanning signal lines which constitute each set are sequentially selected in the same direction, a corresponding scanning signal line is selected during a preliminary charging duration that is set in advance as a duration that precedes a primary charging duration during which the corresponding scanning signal line is selected in order to assign the pixel data to each pixel formation unit, and a voltage, which is to be applied, as a data signal, to each subsidiary data signal line during the primary charging duration for the scanning signal line, for which the preliminary charging duration is set earlier than the primary charging duration for the scanning signal line that is to be selected earliest among each set of the scanning signal line group, is also applied during the preliminary charging duration. Accordingly, a pixel capacitance of a pixel formation unit that corresponds to a scanning signal line, for which a preliminary charging duration is set earlier than the primary charging duration for a scanning signal line (a head scanning signal line in each set) that is to be selected earliest among each set of the scanning signal line group is also preliminarily charged by a voltage that is the same as a voltage of a corresponding data signal line during primary charging duration. As a result, although a preliminary charging scheme is employed in the intra-screen division drive, a difference in luminance does not occur between a pixel formation unit that corresponds to the last scanning signal line in each set and a pixel formation unit that corresponds to a head scanning signal line in a set that succeeds the set, and a pseudo-line is suppressed from occurring in border portions of scanning signal line groups in adjacent two sets. Therefore, the scanning signal lines in each set are sequentially selected in the same direction, and thus a high definition image can be further successfully displayed by the intra-screen division drive that employs the preliminary charging scheme while suppressing the complication of the circuit configuration.

According to the third aspect of the present invention, in the intra-screen division drive type display device that includes two sets of a preceding scanning signal line group and a succeeding scanning signal line group and in parallel drives scanning signal line groups in the two sets such that scanning signal lines which constitute each set are sequentially selected in the same direction, a data signal that is to be applied to a subsidiary data signal line which intersects the preceding scanning signal line group is generated based on image data in the first half of each frame in an input signal that is assigned, as a signal representing an image that is to be displayed, from the outside, and a data signal that is to be applied to a subsidiary data signal line which intersects the succeeding scanning signal line group is generated based on an image data in the second half of a frame that immediately precedes a frame for an input signal that corresponds to the data signal that is to be applied to the subsidiary data signal line which intersects the preceding scanning signal line group. Accordingly, a gap is overcome between a timing at which pixel data is written to a pixel formation unit that corresponds to both the signal line groups in border portions of the preceding scanning signal line group and succeeding scanning signal line group and a temporal relationship of image data in an input signal that corresponds to the pixel data, and the continuity of a display image in the border portions in a case where a moving image is displayed is maintained. Because of this, smooth display of the moving image without falling of frames is possible. Accordingly, the scanning signal lines in each set are sequentially selected in the same direction, and thus a high-definition moving image can be successfully displayed by the inter-screen division drive while suppressing the complication in the circuit configuration.

According to the fourth aspect of the present invention, image data that is indicated by an input signal is written to a memory, and image data that is equivalent to the first half of one frame for an input signal is read, at a speed that is half of a writing speed, from the memory and is supplied to a preceding data signal line drive circuit, such that the memory in which image data for 1.5 frames for an input signal is possibly stored functions as a ring buffer. Furthermore, concurrently with the reading of the image data that is equivalent to the first half of the one frame, the image data that is equivalent to the second half of a frame that immediately precedes the one frame is read, at a speed that is half of the writing speed, from the memory, and is supplied to the succeeding data signal line drive circuit. Accordingly, in the intra-screen division drive type display device in which the scanning signal lines that constitute each set are sequentially selected in the same direction, smooth display of the moving image without the falling of frames can be performed while suppressing an increase in a memory capacity.

Effects according to other aspects of the present invention are apparent from the effects according to the aspects of the present invention and embodiments that will be described below, and thus descriptions thereof are omitted.

DESCRIPTION OF EMBODIMENTS

1. Embodiments

<1.1 Entire Configuration and Outline of Operation>

Figure 1:
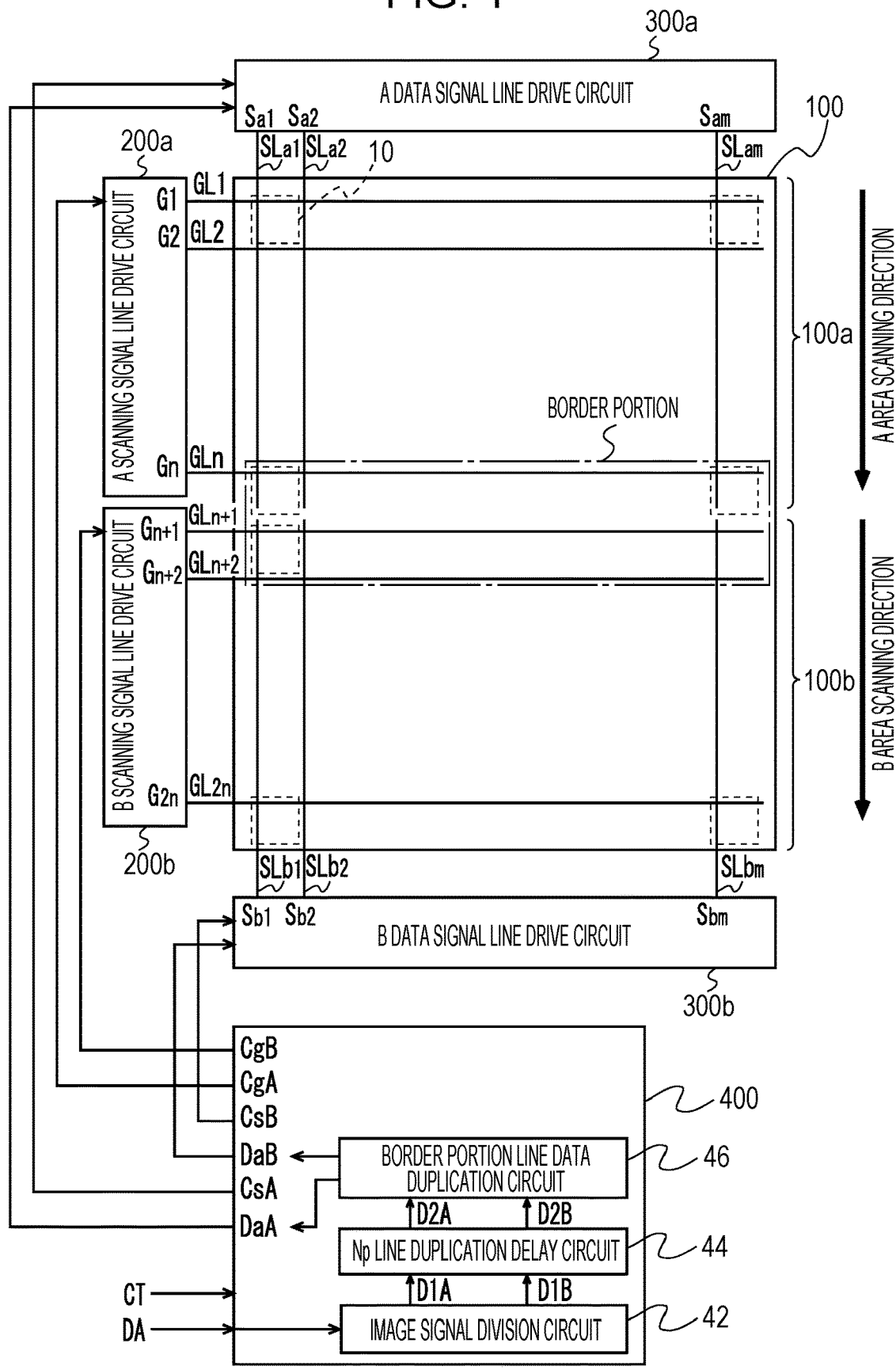
FIG. 1 is a block diagram illustrating a configuration of a liquid crystal display device according to an embodiment.

FIG. 1 is a block diagram illustrating a configuration of a liquid crystal display device according to an embodiment. In the liquid crystal display device, an intra-screen division drive scheme and a preliminary charging scheme are employed that will be described below. As illustrated in FIG. 1, the liquid crystal display device includes a liquid crystal panel 100 as a display panel, a data signal line drive circuit, a scanning signal line drive circuit, a common electrode drive circuit, and a display control circuit 400. The common electrode drive circuit (not illustrated) is a circuit for supplying a voltage a common electrode Ec, which will be described below, in the liquid crystal panel 100. Furthermore, in the liquid crystal panel 100, there is a need for a backlight that irradiates a rear surface of the liquid crystal panel 100 with light in order to display an image. The liquid crystal display device includes such backlight (not illustrated). Configurations of the common electrode drive circuit and the backlight themselves and configurations associated with these are well-known, and do not have direct relationships with the features of the present embodiment. Thus, detailed descriptions thereof are omitted.

Positioned in the liquid crystal panel 100 are a plurality of (m) data signal lines SL1 to SLm, and a plurality of (2n) canning signal lines GL1 to GL2n that intersect the data signal lines SL1 to SLm. (m×2n) image formation units 10 are provided in a matrix form along the data signal lines SL1 to SLm and the scanning signal lines GL1 to GL2n. In the present embodiment, the intra-screen division drive scheme is employed, and the liquid crystal panel 100, as illustrated in FIG. 1, is made up of an A area 100a and a B area 100b. Each data signal line SLj is made up of an A area data signal line SLaj as a subsidiary data signal line that is positioned in the A area 100a, and a B area data signal line SLbj as a subsidiary data signal line that is positioned in the B area 100b (j=1, 2, and so forth up to m), and the A area data signal line SLaj and the B area data signal line SLbj are electrically separated from each other. That is, each data signal line SLj is configured with two conductors, the A area data signal line SLaj as one conductor, and the B area data signal line SLbj as any other conductor. Furthermore, among 2n scanning signal lines, first to n-th scanning signal lines GL1 to GLn are positioned, as a preceding scanning signal line group, in the A area 100a, and (n+1)-th to 2n-th scanning signal lines GLn+1 to GL2n are positioned, a succeeding scanning signal line group, in the B area 100b. Therefore, each A area data signal line SLaj intersects the A area scanning signal lines GL1 to GLn, and each B area data signal line SLbj intersects the B area scanning signal lines GLn+1 to GL2n. It is noted that whether the scanning signal line group is a "preceding" or "succeeding" group is determined based on a scanning direction, on the assumption that the areas 100a and 100b of the liquid crystal panel are scanned in the same direction.

Figure 2:
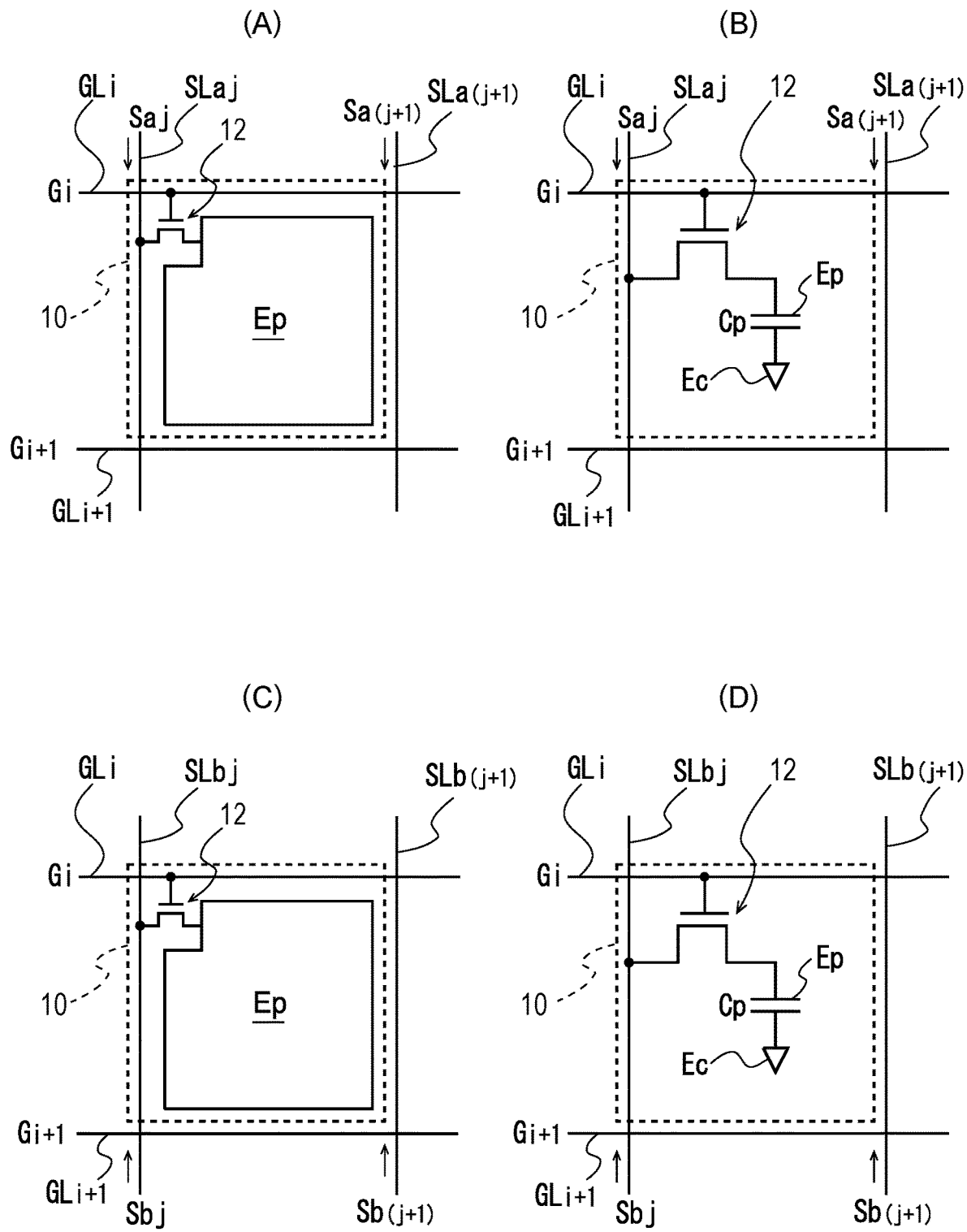
FIGS. 2(A), 2(B), 2(C), and 2(D) are diagrams for describing a configuration of a pixel formation unit according to the embodiment.

FIG. 2(A) is a diagram schematically illustrating a configuration of one pixel formation unit 10 in the A area 100a of the liquid crystal panel. FIG. 2(B) is a diagram illustrating an electrical configuration of the pixel formation unit 10. Each pixel formation unit 10 in the A area 100a of the liquid crystal panel corresponds to any one of the A area data signal line SLa1 to SLam and any one of the A area scanning signal lines GL1 to GLn. As illustrated in FIGS. 2(A) and 2(B), each pixel formation unit 10 includes a thin film transistor (TFT) 12, as a switching element, whose source terminal, as one conductive terminal, is connected to a corresponding A area data signal line SLaj, and whose gate terminal, as a control terminal, is connected to a corresponding A area scanning signal line GLi, a pixel electrode Ep that is connected to a drain terminal, as the other conductive terminal, of the TFT 12, a liquid crystal layer that is provided in a shared manner on (m×2n) pixel formation units 10, and the common electrode Ec that is disposed to face the pixel electrode Ep with the liquid crystal that is provided in a shared manner on the (m×2n) pixel formation units 10 interposed in between. In each pixel formation unit 10, a pixel capacitance Cp for retaining a voltage indicating pixel data (a gradation value of a pixel) is formed with the pixel electrode Ep, the common electrode Ec, and the liquid crystal layer interposed in between.

FIG. 2(C) is a diagram schematically illustrating the configuration of one pixel formation unit 10 in the B area 100b of the liquid crystal panel. FIG. 2(D) is a circuit diagram illustrating the electrical configuration of the pixel formation unit 10. Each pixel formation unit 10 in the B area 100b of the liquid crystal panel has the same configuration (FIGS. 2(A) and 2(B)) as the pixel formation unit 10 in the A area 100a as well. However, the corresponding B area data signal line SLbj (1≤j≤m) is connected to one conductive terminal (the source terminal) of the TFT 12 as the switching element in each pixel formation unit 10 in the B area 100b, and the corresponding B area scanning signal line GLi (n+1≤i≤2n) is connected to the control terminal (the gate terminal) of the TFT 12.

As illustrated in FIG. 1, the data signal line drive circuit is made up of an A data signal line drive circuit 300a that is connected to the A area data signal line SLa1 to SLam, and a B data signal line drive circuit 300b that is connected to B area data signal lines SLb1 to SLbm. Furthermore, the scanning signal line drive circuit is made up of an A scanning signal line drive circuit 200a that is connected to the A area scanning signal lines GL1 to GLn, and a B scanning signal line drive circuit 200b that is connected to the B area scanning signal lines GLn+1 to GL2n.

The display control circuit 400 receives an image signal DA that represents an image that is to be displayed and a timing control signal CT, from the outside, generates an A area image signal DaA and an A area data side control signal CsA based on the signals DA and CT, and assigns the generated signals DaA and CsA to the A data signal line drive circuit 300a. Along with this, the display control circuit 400 generates a B area image signal DaB and a B area data side control signal CsB and assigns the generated signals DaB and CsB to the B data signal line drive circuit 300b. Furthermore, the display control circuit 400 generates an A area scanning side control signal CgA based on the timing control signal CT from the outside and assigns the generated signal GgA to the A scanning signal line drive circuit 200a. Along with this, the display control circuit 400 generates a B area scanning side control signal CgB and assigns the generated signal CgB to the B scanning signal line drive circuit 200b.

The A area 100a in the liquid crystal panel is driven by the A data signal line drive circuit 300a and the A scanning signal line drive circuit 200a. That is, based on the A area image signal DaA and the A area data side control signal CsA, the A data signal line drive circuit 300a generates A area data signals Sa1 to Sam that are voltage signals which represent an image that is to be displayed on the A area 100a, and applies the generated signals Sa1 to Sam to the A area data signal line SLa1 to SLam, respectively. Furthermore, the A scanning signal line drive circuit 200a generates A area scanning signals G1 to Gn based on the A area scanning side control signal CgA, and applies the generated signals G1 to Gn to the A area scanning signal lines GL1 to GLn, respectively. Thus, during each frame duration, the A area scanning signal lines GL1 to GLn (in the direction from GL1 to GLn) are sequentially selected in ascending order.

The B area 100b in the liquid crystal panel is driven by the B data signal line drive circuit 300b and the B scanning signal line drive circuit 200b, concurrently with the driving of the A area 100a in the liquid crystal panel. That is, the B data signal line drive circuit 300b generates B area data signals Sb1 to Sbm that are voltage signals which represent an image that is to be displayed on the B area 100b, based on the B area image signal DaB and the B area data side control signal CsB, and applies the generated signals Sb1 to Sbm to the B area data signal lines SLb1 to SLbm, respectively. Furthermore, the B scanning signal line drive circuit 200b generates B area scanning signals Gn+1 to G2n based on the B area scanning side control signal CgB and applies the generated signals Gn+1 to G2n to the B area scanning signal lines GLn+1 to GL2n, respectively, and thus, sequentially selects the B area scanning signal lines GLn+1 to GL2n in ascending order sequentially (in the direction from GLn+1 to GL2n) during each frame duration.

It is noted, as described above, the A area scanning signal lines GL1 to GLn and the B area scanning signal lines GLn+1 to GL2n are sequentially selected in the same direction (in ascending order in the present implementation example), and thus that because the A area 100a and the B area 100b are scanned in parallel in the same direction, the complication of a circuit configuration in a case where the A area 100a and the B area 100b are scanned in the reverse direction as in the related art can be avoided.

A voltage that is determined in advance is supplied, as a common voltage Vcom, from the common electrode drive circuit that is not illustrated to the common electrode Ec in the liquid crystal panel 100.

Furthermore, a planar light source that is not illustrated is provided, as the backlight, on the rear surface of the liquid crystal panel 100, and the rear surface of the liquid crystal panel is irradiated with light from the backlight. It is noted that the liquid crystal panel 100 in the present embodiment is of a transmission type, but that a backlight unit 50 does not need to be provided in a case where the liquid crystal panel 100 is of a reflection type.

In the liquid crystal panel 100 as described above, the A area data signals Sa1 to Sam and the B area data signals Sb1 to Sbm that are generated based on the image signal DA and the timing control signal CT from the outside are applied to the A area data signal line SLa1 to SLam and the B area data signal lines SLb1 to SLbm, respectively, and the A area scanning signals G1 to Gn and the B area scanning signals Gn+1 to G2n that are generated based on the timing control signal CT from the outside are applied to the A area scanning signal lines GL1 to GLn and the B area scanning signal lines GLn+1 to GL2n, respectively. The A area 100a and the B area 100b of the liquid crystal panel are driven in parallel in this manner, and thus a voltage that represents each piece of pixel data of an image that is to be displayed is assigned to pixel capacitance Cp of the corresponding pixel formation unit 10 and the voltage that is retained in each pixel capacitance Cp is rewritten every frame duration. Accordingly, the liquid crystal panel 100 applies a voltage in accordance with the image signal DA to the liquid crystal layer, and thus changes a light transmittance and displays an image that is represented by the image signal DA.

It is noted that in the liquid crystal display device that is illustrated in FIG. 1, the data signal line drive circuits (300a and 300b), the scanning signal line drive circuits (200a and 200b), and the common electrode drive circuit are constituent elements that are separated from the liquid crystal panel 100, but that at least one of the data signal line drive circuits, the scanning signal line drive circuit, and the common electrode drive circuit may be configured to be formed on a substrate of the liquid crystal panel 100 in a manner that is integrally (simultaneously in the same process) combined with a pixel circuit using a TFT.

<1.2 Display Control Circuit>

Next, the display control circuit 400 in the present embodiment will be described with reference with FIGS. 3 to 5.

Figure 5:
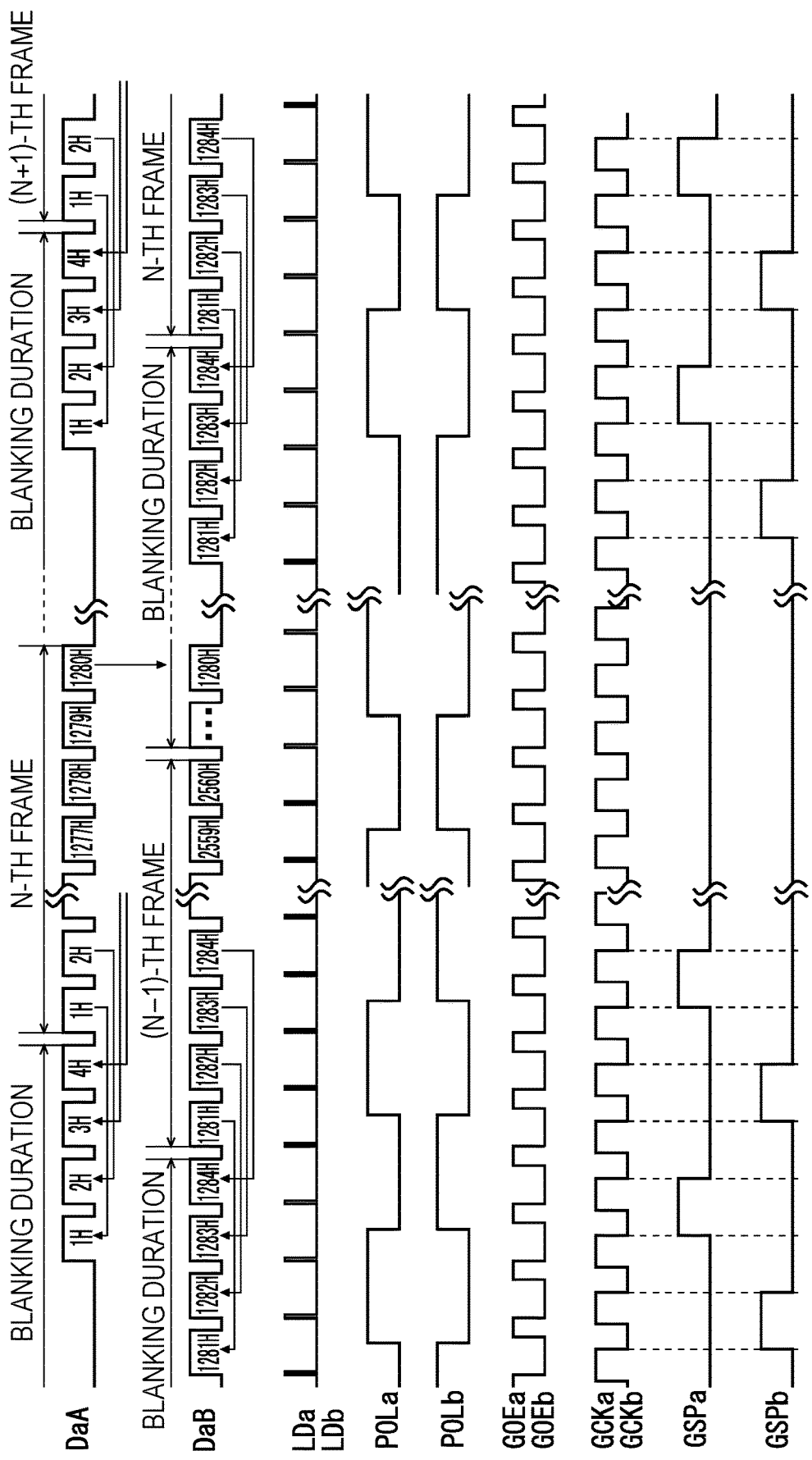
FIG. 5 is a timing chart for describing operation of the liquid crystal display device according to the embodiment.

FIG. 5 is a timing charge for describing operation of the liquid crystal display device according to the present embodiment, which includes the display control circuit 400. The "frame duration" in FIG. 5 is a duration that results from excluding a (vertical) blanking duration from the frame duration, as an effective scanning duration, that is, from vertical scanning duration. In FIG. 5, for convenience, a signal portion of one horizontal duration, of the A area image signal DaA, and a signal portion of one horizontal duration, of the B area image signal DaB are each represented with one pulse. Furthermore, in the present embodiment, a scheme (hereinafter referred to as a "preliminary charging scheme prior to an Np horizontal duration" or a "preliminary charging scheme" for short) is employed in which charging is preliminarily performed Np horizontal durations (Np=4 in the present embodiment) prior to a horizontal duration (hereinafter referred to as a "primary charging duration") in which the pixel capacitance Cp in each pixel formation unit 10 is to be charged with a voltage that is equivalent to pixel data. Then, in the present embodiment, each pixel formation unit 10 (the pixel capacitance Cp thereof) that corresponds to Np scanning signal lines in a head portion of each of the A area 100a and the B area 100b of the liquid crystal panel is preliminarily charged. Because of this, as illustrated in FIG. 5, in a duration that is equivalent to the Np horizontal durations that immediately precede each frame duration as the effective scanning duration, the A area image signal DaA and the B area image signal DaB are generated in the display control circuit 400 in such a manner that a voltage signal appears that is equivalent to pixel data in the Np horizontal durations which are present immediately before starting the frame duration.

Furthermore, as illustrated in FIG. 5, the B area image signal DaB is a signal that results from delaying by approximately one frame periodicity an image signal in the second half of the frame that is to be supplied to the B data signal line drive circuit 300b concurrently with an operation in which an image signal in the first half of each frame, of the image signal DA from the outside is supplied, as the A area image signal DaA, to the A data signal line drive circuit 300a. More precisely, the B area image signal DaB is a signal that results from delaying the image signal in the second half of the frame by a time that is two horizontal durations shorter than one frame periodicity. In this manner, in the present embodiment, when the image signal in the first half of each frame, of the image signal DA is supplied, as the A area image signal DaA, to the A data signal line drive circuit 300a, an image signal in the second half of a frame that immediately precedes the frame is supplied concurrently, as the B area image signal DaB, to the B data signal line drive circuit 300b. It is noted that one frame periodicity is equivalent to a duration that results from adding the (vertical) blanking duration to the frame duration as the effective scanning duration. At this point, the reason for delaying the B area image signal DaB by approximately one frame periodicity to the image signal in the second half of the frame is to display an image smoothly. The reason for this delay duration being two horizontal durations shorter than one frame periodicity is to suppress a difference in luminance due to a parasitic capacitance in border areas of the A area 100a and the B area 100b (this will be described in detail below).

As illustrated in FIG. 1, the display control circuit 400 in the present embodiment includes an image signal division circuit 42, an Np line duplication delay circuit 44, and a border portion line data duplication circuit 46 to generate the A area image signal DaA and the B area image signal DaB as described above. FIG. 3 is a block diagram illustrating configurations of principal portions of the display control circuit 400, and illustrates configurations of the image signal division circuit 42, the Np line duplication delay circuit 44, and the border portion line data duplication circuit 46 in more detail. In addition to the circuits 42, 44, and 46, the display control circuit 400 includes a changeover control signal generation circuit 48 that generates a first changeover control signal Csw1 and a second changeover control signal Csw2, which will be described below. The image signal DA from the outside is assigned to the image signal division circuit 42, and the timing control signal CT from the outside is assigned to the image signal division circuit 42 and the changeover control signal generation circuit 48.

Figure 3:
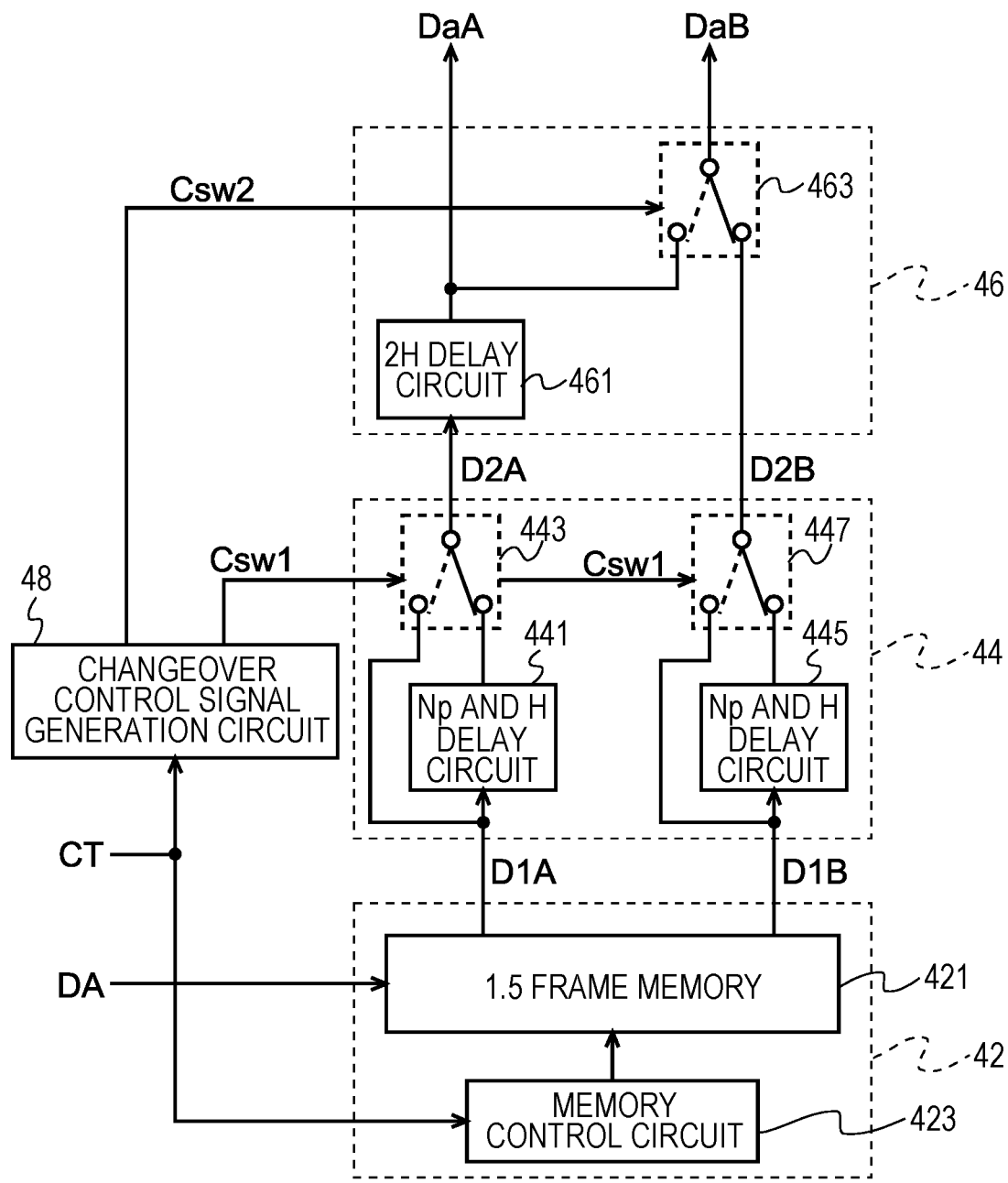
FIG. 3 is a block diagram for describing configurations of principal portions of a display control circuit according to the embodiment.

The image signal division circuit 42 as illustrated in FIG. 3 includes a 1.5 frame memory 421 in which it is possible to store image data (hereinafter referred to as "1.5 frame image data") for 1.5 frames (one and a half frames) in the image signal DA from the outside, which represents an image that is to be displayed, and a memory control circuit 423 that writes image data that is indicated by the image signal DA to the 1.5 frame memory 421 and reads image data that is stored in the 1.5 frame memory 421. The memory control circuit 423 controls the 1.5 frame memory 421 based on the timing control signal CT from the outside. Specifically, the memory control circuit 423 generates a memory control signal based on the timing control signal CT and assigns the generated signal to the 1.5 frame memory 421, and thus successfully writes image data that is indicated by the image signal DA from the outside, to the 1.5 frame memory 421. After image data for the 1.5 frames is written, the memory control circuit 423 overwrites the image data that is indicated by the image signal DA, beginning with the image data that is the earliest written, among the image data in the 1.5 frame memory 421. Accordingly, the 1.5 frame memory 421 functions as a ring buffer.

Figure 4:
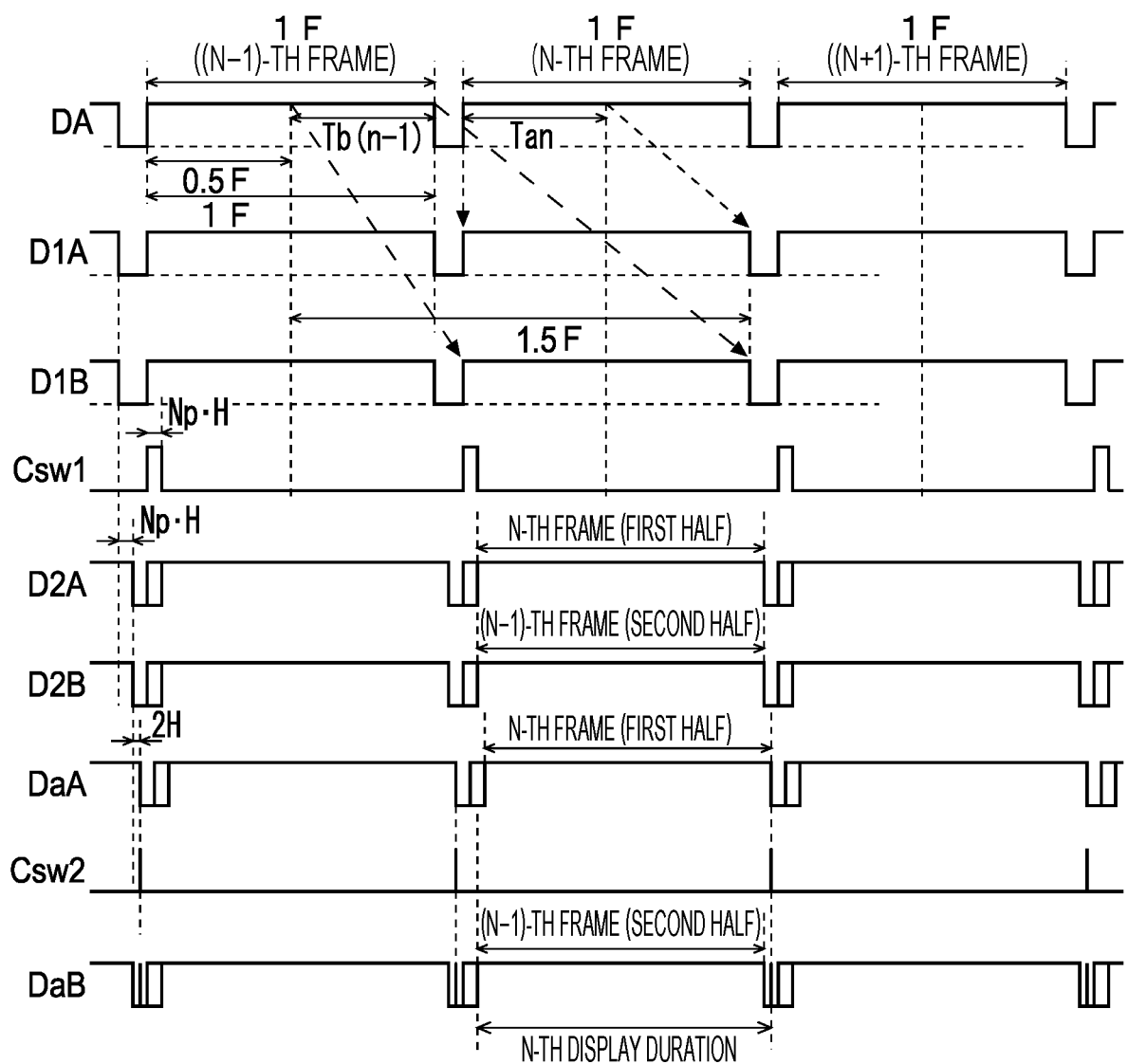
FIG. 4 is a timing chart for describing operation of the principal portions of the display control circuit according to the embodiment.

FIG. 4 is a timing chart for describing operation of each of the principal portions of the display control circuit 400. With the memory control signal, the memory control circuit 423 as illustrated in FIG. 4 reads pieces of data (hereinafter referred to as "A area image data") representing an image that is to be displayed on the A area 100a of the liquid crystal panel, among pieces of image data in the image signal DA, as a first A area image signal D1A, at a speed that is half of a speed of writing to the 1.5 frame memory 421. Along with this, the memory control circuit 423 reads pieces of data (hereinafter referred to "B area image data") representing an image that is to be displayed on the B area 100b of the liquid crystal panel, as a first B area image signal D1B, at a speed that is half of a speed of writing to the 1.5 frame memory 421. At this time, the 1.5 frame memory 421 is controlled in such a manner that the head data is read as a constituent elements of the first A area image signal D1A, immediately after head data in the first half (Tan) of each frame in the image signal DA is written, and in such a manner that the head data is read, as a constituent element of the first B area image signal D1B, after 0.5F periodicities (half of the frame periodicity) have elapsed from a point in time at which head data in the second half (Tb (n−1)) of a frame that immediately precedes the frame in the image data signal DA is written. Therefore, when considering that a speed of reading by the memory control signal is half of a speed of writing, after the 0.5 frame durations (hereinafter also referred to as "0.5F durations") have elapsed from a point in time at which final data, among pieces of A area image data in each frame, is written, the final data is read, as the constituent element of the first A area image signal D1A. Along with this, after one frame duration (which is referred to as a "1F duration", but which, more precisely, is a duration that is the blanking duration longer than the 1F duration) elapsed from a point in time at which final data, among pieces of B area image data in each frame, is written, the final data is, as the constituent element of the first B area image signal D1B (refer to FIG. 4). In this manner, the image signal division circuit 42 generates the first A area image signal D1A and the first B area image signal D1B from the image signal DA.

The Np line duplication delay circuit 44 as illustrated in FIG. 3 includes first and second Np and H delay circuits 441 and 445 and first and second changeover switches 443 and 447, and the first A area image signal D1A and the first B area image signal D1B are input into the first Np and H delay circuit 441 and the second Np and H delay circuit 445, respectively. Input into the first changeover switch 443 are a first A area image (hereinafter also referred to as a "first A area image signal without delay") D1A that did not yet pass through the first Np and H delay circuit 441 and a first A area image signal D1Aa (hereinafter referred to as a "first A area image signal with delay") that passed through the first Np and H delay circuit 441. Of the image signals D1A and D1Aa, the first changeover switch 443 selects the first A area image signal D1A without delay when the first changeover control signal Csw1 is at a high level (H level), and selects the first A area image signal D1Aa with delay when the first changeover control signal Csw1 is at a low level (L level). The first changeover control signal Csw1, as illustrated in FIG. 4, is a signal that maintains the H level during a duration that is equivalent to a head Np and H duration (which is Np times one horizontal duration) of each frame duration in the first A area image signal D1A, and that maintains the L level during the other durations. The image signal that is selected by the first changeover switch 443 based on the first changeover control signal Csw1 is output, as a second A area image signal D2A as illustrated in FIG. 4, from the Np line duplication delay circuit 44. Image data that is the same as image data during the head Np and H duration of the frame duration is included in the second A area image signal D2A, during a duration that is equivalent to the Np and H duration that immediately precedes each frame duration (each effective scanning duration).

Input into the second changeover switch 447 are a first B area image (hereinafter also referred to as a "first B area image signal without delay") D1B that did not yet pass through the second Np and H delay circuit 445 and a first B area image signal D1Ba (hereinafter also referred to as a "first B area image signal with delay") that passed through the second Np and H delay circuit 445. Of the image signals D1B and D1Ba, the second changeover switch 447 selects the first B area image signal D1B without delay when the first changeover control signal Csw1 is at the H level, and selects the first B area image signal D1Ba with delay when the first changeover control signal Csw1 is at the L level. The image signal that is selected by the second changeover switch 447 is output, as a second B area image signal D2B as illustrated in FIG. 4, from the Np line duplication delay circuit 44. Image data that is the same as image data during the head Np and H duration of the frame duration is also included in the second B area image signal D2B, during a duration that is equivalent to the Np and H duration that immediately precedes each frame duration (each effective scanning duration).

The border portion line data duplication circuit 46, as illustrated in FIG. 3, includes a 2H delay circuit 461 and a third changeover switch 463. The second A area image signal D2A is input into the 2H delay circuit 461, and the second A area image signal that passed through the 2H delay circuit 461 is output, as the A area image signal DaA, from the border portion line data duplication circuit 46.

The A area image signal DaA that is the second A area image signal which passes through the 2H delay circuit 461, and the second B area image signal D2B are input into the third changeover switch 463. Of the image signals DaA and D2B, the third changeover switch 463 selects the A area image signal DaA when the second changeover control signal Csw2 is at the H level, and selects the second B area image signal D2B when the second changeover control signal Csw2 is at the L level. The second changeover control signal Csw2, as illustrated in FIG. 4, is a signal that is at the H level during a 1H duration (one horizontal duration) that is the last portion of each frame duration in the A area image signal DaA and that is at the L level during the other durations. It is noted that each frame duration in the A area image signal DaA is delayed by a 2H duration (a duration that is two times one horizontal duration) with respect to a corresponding frame duration of the second A area image signal D2A (refer to FIG. 4). The image signal that is selected by the third changeover switch 463 based on the second changeover control signal Csw2 is output, as the B area image signal DaB, from the border portion line data duplication circuit 46.

With the configuration described above, which is illustrated in FIGS. 3 and 4, when it is assumed that Np which is a parameter of the preliminary charging scheme is 4 and that the number of scanning lines of each frame is 2560, the A area image signal DaA and the B area image signal DaB, as are illustrated in FIG. 5, are generated in the display control circuit 400, and the generated signals DaA and DaB are supplied to the A data signal line drive circuit 300a and the B data signal line drive circuit 300b, respectively (refer to FIG. 1).

Furthermore, the display control circuit 400 generates an A area load signal LDa and an A area polarity control signal POLa, as are illustrated in FIG. 5, or an A area data side clock signal (not illustrated), as signals that constitute the A area data side control signal CsA which is to be supplied to the A data signal line drive circuit 300a. Along with this, the display control circuit 400 generates a B area load signal LDb and a B area polarity control signal POLb, as are illustrated in FIG. 5, or the B area data side clock signal, as signals that constitute the B area data side control signal CsB that is to be supplied to the B data signal line drive circuit 300b.

Moreover, the display control circuit 400 generates an A area scanning side output control signal GOEa, an A area scanning side clock signal GCKa, and an A area scanning side start pulse signal GSPa, as are illustrated in FIG. 5, as signals that constitute the A area scanning side control signal CgA that is to be supplied to the A scanning signal line drive circuit 200a. Along with this, the display control circuit 400 generates a B area scanning side output control signal GOEb, a B area scanning side clock signal GCKb, and a B area scanning side start pulse signal GSPb, as are illustrated in FIG. 5, as signals that constitute the B area scanning side control signal CgB that is to be supplied to the B scanning signal line drive circuit 200b.

The liquid crystal panel 100 is driven, as described above, by the A data signal line drive circuit 300a and the B data signal line drive circuit 300b, and the A scanning signal line drive circuit 200a and the B scanning signal line drive circuit 200b, which are based on various signals (refer to FIG. 5) that are generated by the display control circuit 400, and the like, and thus an image that are represented by the image signal DA from the outside is displayed on the liquid crystal panel 100.

<1.3 Action and Effect>
<1.3.1 Action and Effect that are Based on a First Feature of the Present Embodiment>

In the following, as illustrated in FIG. 4, it is assumed that a duration during which an image that is represented by pieces of image data in an N-th frame (more precisely, the first half of an N-th frame) in the image signal DA from the outside is displayed on the A area 100a of the liquid crystal panel is referred to as an "N-th display duration". From the descriptions of the image signal division circuit 42 in the display control circuit 400, which are provided above, it is understood that the first A area image signal D1A which is used during the N-th display duration is equivalent to the first half (Tan) of an N-th frame in the image signal DA from the outside, and that the first B area image signal D1B which is used during the N-th display duration is equivalent to the second half (Tb(n−1)) of the N-th frame in the image signal DA from the outside (refer to FIG. 4). Therefore, during the N-th display duration, an image that is represented by pieces of image data in the first half (Tan) of the N-th frame of the image signal DA is displayed on the A area 100a of the liquid crystal panel, and an image that is represented by pieces of image data in the second half (Tb(n−1)) of a (N−1)-th frame of the image signal DA is displayed on the B area 100b of the liquid crystal panel. For this reason, for the display on the B area 100b of the liquid crystal panel, an image signal that precedes by one frame an image signal that is used for the display on the A area 100a (this is hereinafter referred to as a "first feature in the present embodiment"). The action and effect of the first feature will be described below.

Figure 6:
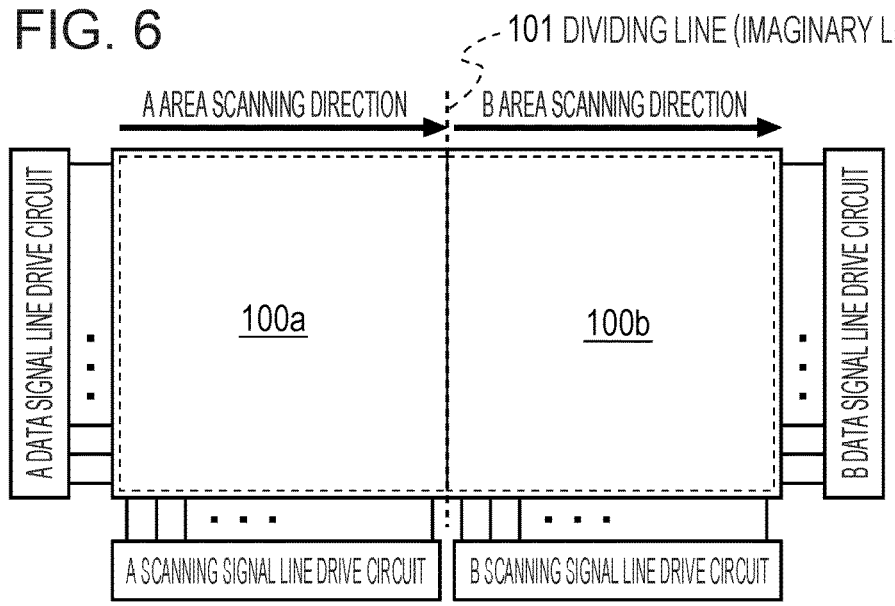
FIG. 6 is a block diagram illustrating a positional configuration of the liquid crystal display device for describing an action and effect that are based on a first feature according to the embodiment.
Figure 7:
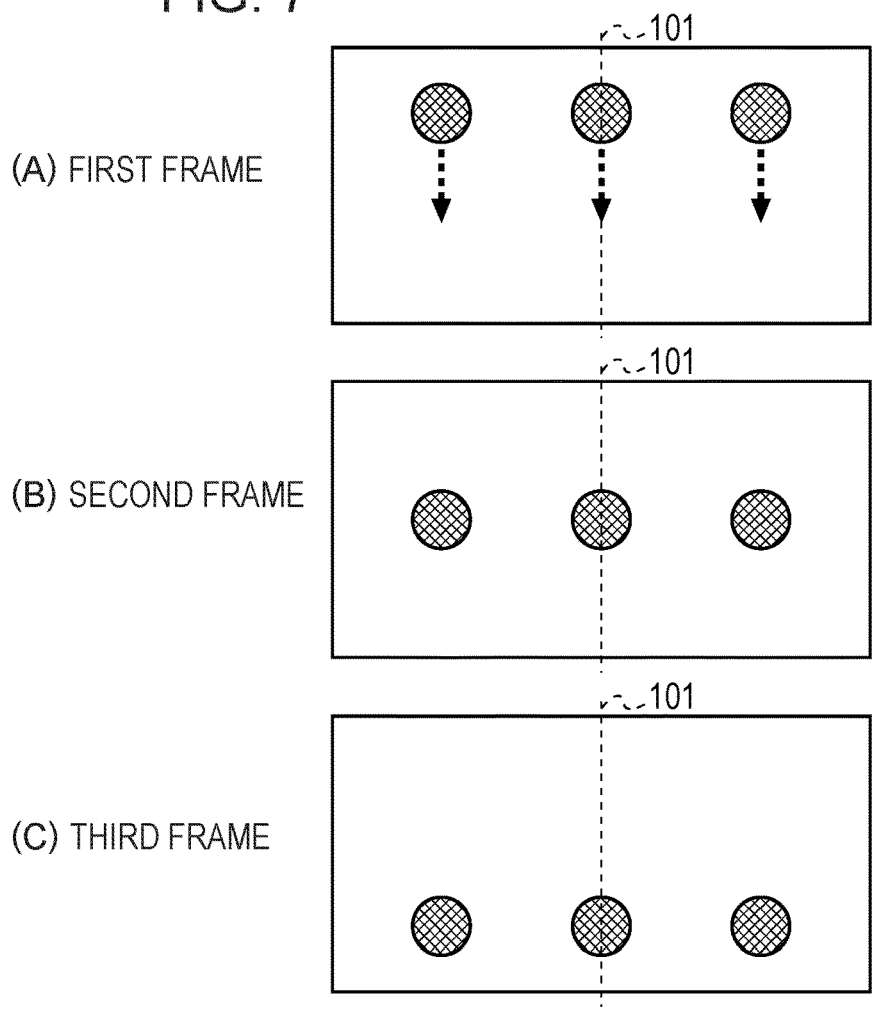
FIGS. 7(A), 7(B), and 7(C) are diagrams illustrating a display image that is used for describing the action and effect that are based on the first feature according to the embodiment.

FIG. 6 is a block diagram illustrating a positional configuration of the liquid crystal display device according to the present embodiment for describing the action and effect that is based on the first feature. A position of the liquid crystal display device that is illustrated in FIG. 6 results from rotating a position of the liquid crystal display device, which is illustrated in FIG. 1, by 90 degrees. In the following, when considering the display of a moving image that is illustrated in FIG. 7 on the assumption of this position, regarding the moving image, the upward-downward direction (the vertical direction) and the leftward-rightward direction (the horizontal direction) are set to be defined on the assumption of the position. In an example that is illustrated in FIG. 7, among pieces of image data that are included in the image signal DA from the outside, pieces of image data in first, second and third frames represent images in FIGS. 7(A), 7(B), and 7(C), respectively. That is, the image signal DA represents a moving image that results from three circles arranged side by side in the horizontal direction moving at the same speed in the downward direction on the drawing. It is noted that, in the following, it is assumed that a border between the A area 100a and the B area 100b of the liquid crystal panel is indicated by an imaginary dividing line 101, and that an area in the vicinity of the dividing line 101 on the liquid crystal panel 100 is referred to as a "border portion".

Figure 8:
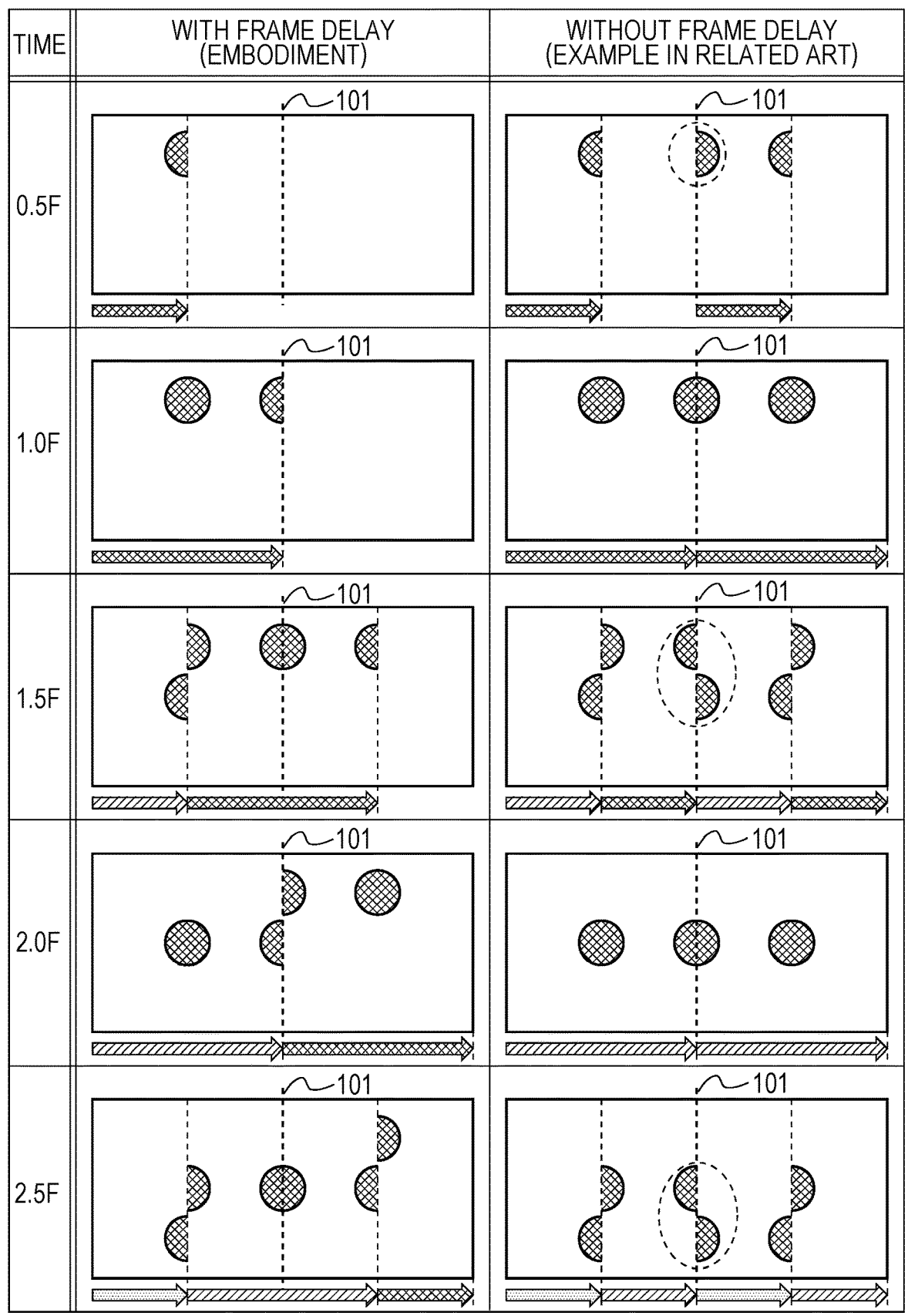
FIG. 8 is a diagram for describing the action and effect that are based on the first feature according to the embodiment.

FIG. 8 is a diagram for describing the action and effect according to the present embodiment in a case where the moving image in FIG. 7 is displayed, by comparison with those in the related art. FIG. 8 illustrates states of the display in a case where the moving image in FIG. 7 at a point in time (0.5F) that is when 0.5 frames durations have elapsed after the display starts, a point in time (1.0F) that is when one frame duration has elapsed, a point in time (1.5F) that is when 1.5 frame durations have elapsed, a point in time (2.0F) that is when two frame durations have elapsed, and a point in time (2.5F) that is when 2.5 frame durations have elapsed, respectively. A column on the left side of FIG. 8 indicates a display state in a case where the moving image in FIG. 7 is displayed in the present embodiment that includes the image signal division circuit 42 which correspond to the first feature described above, that is, the image signal division circuit 42 (FIGS. 1 and 3) that cause a frame delay. A column on the right side of FIG. 8 indicates a display state in a case where the moving image in FIG. 7 is displayed in the liquid crystal display device in the related art that complies with the intra-screen division drive scheme, which includes an image signal division circuit that does not support the first feature described above, that is, an image signal division circuit (hereinafter referred to as an "example in the related art") that does not cause a frame delay.

In the example (which cases the frame delay) in the related art, as illustrated in the column on the right side of FIG. 8, a display state (a circle in this example) where a border portion (in the vicinity of the dividing line 101) of the liquid crystal panel 100 lacks in continuity starts immediately from a point in time 1.0F and ends immediately before a point in time 2.0F, and regarding the moving image that is displayed, falling of frames is visually recognized in the border portion of the liquid crystal panel 100. This is due to a gap between a timing for writing piece of pixel data to the pixel formation unit (the pixel formation unit in the A area and the B area in the vicinity of the dividing line 101) in the border portion of the liquid crystal panel, and a temporal relationship of the image data in the image signal DA that corresponds to the pieces of pixel data.

In contrast, in the present embodiment (in which the frame delay is caused), for the display on the B area 100b of the liquid crystal panel, an image signal that precedes by one frame an image signal that is used for the display on the A area 100a. Because of this, the gap is closed between the timing for writing the piece of pixel data to the pixel formation unit in the A area 100a and the B area 100b in the vicinity of the dividing line 101 on the liquid crystal panel 100 and the temporal relationship of the image data in the image signal DA that corresponds to the pieces of pixel data. For this reason, regardless of the A area 100a and the B area 100b being scanned in parallel in the same direction (refer to FIG. 6 and FIG. 9 that will be referred to below for description), as the column on the left side of the FIG. 8, the A area 100a through the dividing line 101 to the B area 100b are sequentially refreshed with image data in the same frame in the image signal DA (refer to the display states particularly at the points in time 1.5F and 2.5F). As a result, the continuity of the display image is maintained and the falling of frames is suppressed from taking place in the border portion of the liquid crystal panel 100. As a result, the continuity of the display image is maintained, and the falling of frames is suppressed from taking place in the border portion of the liquid crystal panel 100.

According to the present embodiment as described above, based on the first feature, the display of the moving image can be smoothly performed without the falling of frames while employing the intra-screen division drive scheme for the purpose of supporting an enhancement in high definition of the display image.

<1.3.2 Action and Effect that is Based on a Second Feature According to the Present Embodiment>

Figure 9:
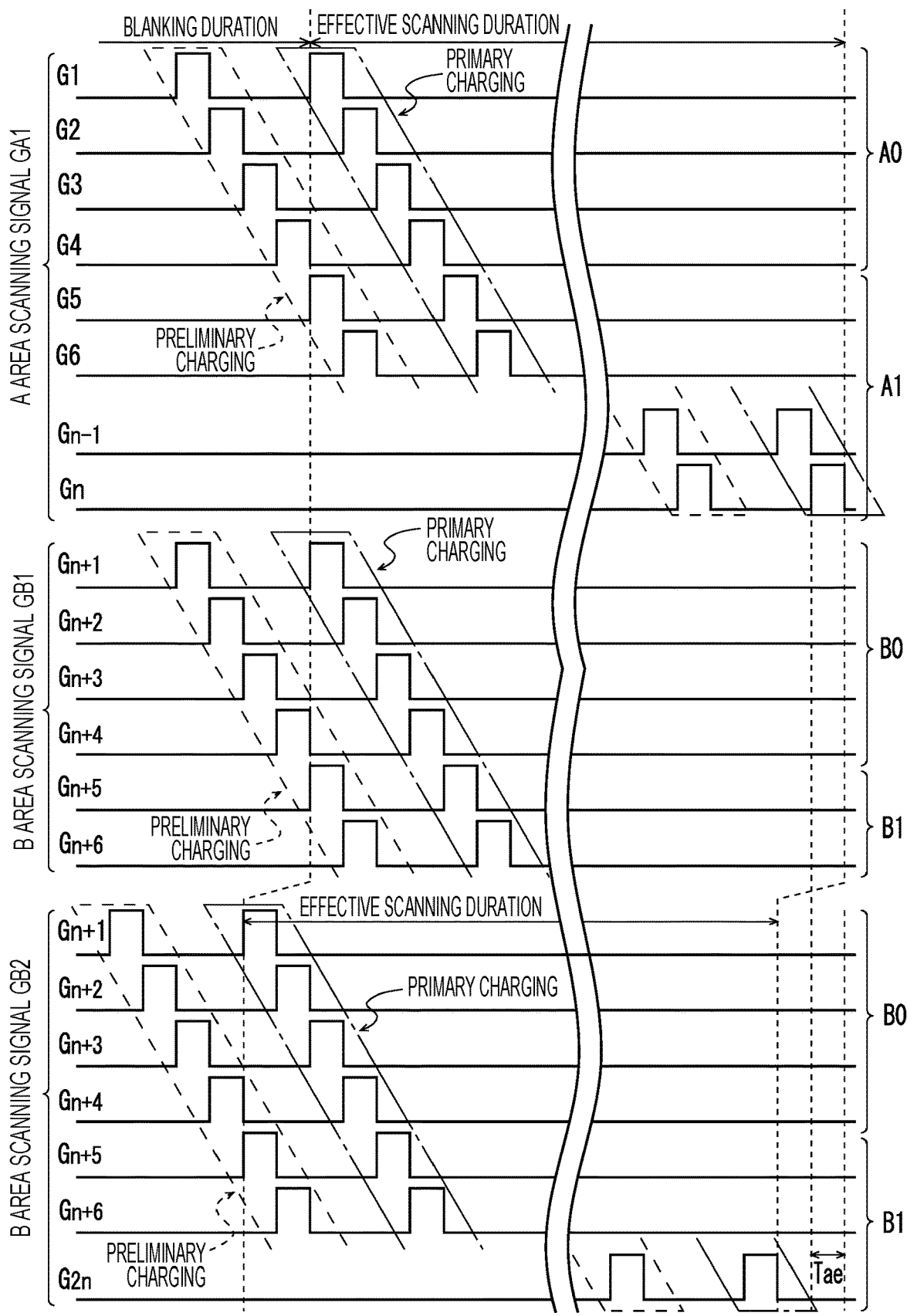
FIG. 9 is a diagram illustrating a waveform of a scanning signal for describing a second feature according to the embodiment, and an action and effect that are based on the second feature.

FIG. 9 is a diagram illustrating waveforms of scanning signals G1 to G2n in a display device in compliance with the intra-screen division drive scheme, in which the preliminary charging scheme is employed as in the present embodiment. In the display device in compliance with the intra-screen division drive scheme, in which the preliminary charging scheme is employed, for example, an A area scanning signal GA1 that is made up of G1 to Gn, as A area scanning signals, that are illustrated in FIG. 9 is used, and a first B area scanning signal GB1 that is made up of Gn+1 to G2n, as B area scanning signals, that are illustrated in FIG. 9 is used. It is noted that in the present embodiment, instead of the first B area scanning signal GB1, a second B area scanning signal GB2 that is illustrated in FIG. 9 is used as the B area scanning signal, but that the action and effect that results from the use of the second B area scanning signal GB2 will be described below.

At the present time, the liquid crystal display device in compliance with the intra-screen division drive scheme, in which the preliminary charging scheme is employed, the liquid crystal panel 100 that is made up of the A area 100a and the B area 100b is included in the same manner as in the present embodiment, but a configuration (hereinafter referred to as a "preliminary charging configuration without line duplication") in which the Np line duplication delay circuit 44 (FIGS. 1 and 3) is not included is configured. In the preliminary charging configuration without the line duplication, a voltage of each data signal line SLj is a voltage that is present during the falling of frames, that is, a black voltage, even when preliminary charging is performed on the pixel formation unit 10 (the pixel capacitance Cp thereof) that corresponds to any scanning signal line of head Np scanning signal lines (head four scanning signal lines GL1 to GL4 in the A area 100a and head four scanning signal lines GLn+1 to GLn+4 in the B area 100b in the present embodiment) in each of the A area 100a and the B area 100b during each frame duration (even during the preliminary charging duration). At this point, when it is assumed that the liquid crystal panel 100 is in a normally white mode and that an image is displayed with 256 gradations ranging from a gradation value 0 to a gradation value 255, a relationship among a voltage V0 indicating the black voltage, that is, the gradation value 0, a voltage V128 indicating the intermediate gradation value 128, and a voltage V255 indicating the maximum gradation value 255 is V0>V128>V255.

For this reason, in a case where, at the intermediate gradation value 128, all areas of the liquid crystal panel 100 are for display, a voltage that is retained, by the present charging, in the pixel capacitance Cp of the pixel formation unit 10 (hereinafter also referred to as a "head Np line") that corresponds to the head Np scanning signal lines (refer to scanning signal groups A0 and B0 in FIG. 9) in each of the areas 100a and 100b, that is, a pixel voltage is somewhat higher than a pixel voltage (V128) of the pixel formation unit (hereinafter referred to as a "line other than the head Np line) that corresponds to scanning signal lines (refer to scanning signal groups A1 and B1 in FIG. 9) other than the head Np scanning signal lines in each of the areas 100a and 100b, due to the influence of the preliminary charging due to a black voltage V0. As a result, a difference in voltage between the pixel formation unit 10 (hereinafter referred to an "A area final-line") that corresponds to the final scanning signal line GLn in the A area 100a and the pixel formation unit 10 (hereinafter referred to a "B area head-line") that corresponds to the head scanning signal GLn+1 in the B area 100b appears as a difference in luminance, and this is visually recognized as a line in the center portion (the border portion of the liquid crystal panel 100) of the display image.

It is noted that even in a case where the liquid crystal panel in a normally black mode is used, the pixel voltage of the head Np line in each of the areas 100a and 100b is somewhat lower than the pixel voltage of a line other than the head Np line, and thus that the difference in luminance occurs between the A area final-line and the B area head-line and this is visually recognized as a line in the center portion (the border portion of the liquid crystal panel 100) of the display image).

In contrast, in the present embodiment, the display control circuit 400 includes the Np line duplication delay circuit 44 (refer to FIGS. 1 and 3). Thus, as illustrated in FIG. 5, the A area image signal DaA and the B area image signal DaB include image data that is the same as image data that is present during the head Np and H duration (four horizontal durations) of the frame duration, during a duration that is equivalent to the Np and H duration (four horizontal durations) that immediately precedes the frame duration (this is referred to as a second feature in the present embodiment). For this reason, at the time of the preliminary charging in the head Np line in each of the areas 100a and 100b, a voltage (the voltage V128 indicating the intermediate gradation value 128 in the example described above) indicating the same image data is assigned to each data signal line SLj, and the pixel capacitance Cp in the head Np line is charged with this voltage. For this reason, a difference in the pixel voltage due to the preliminary charging does not occur in the head Np line and a line other than the head Np line in each of the areas 100a and 100b. As a result, because the difference in the pixel voltage does not occur between the A area final-line and the B area head-line, the difference in luminance does not occur either, and in the border portion of the border portion of the liquid crystal panel 100, a line (hereinafter referred to as a "pseudo-line") that does not have a relationship with an image that is to be displayed is not visually recognized.

According to the present embodiment as described above, in the liquid crystal display device in which the intra-screen division drive scheme and the preliminary charging scheme are both employed for the purpose of supporting the enhancement in high definition of the display image, based on the second feature, the pseudo-line can be suppressed from occurring in the border portion of the liquid crystal panel 100 and an image can be successfully displayed.

<1.3.3 Action and Effect that are Based on a Third Feature in the Present Embodiment>

Figure 10:
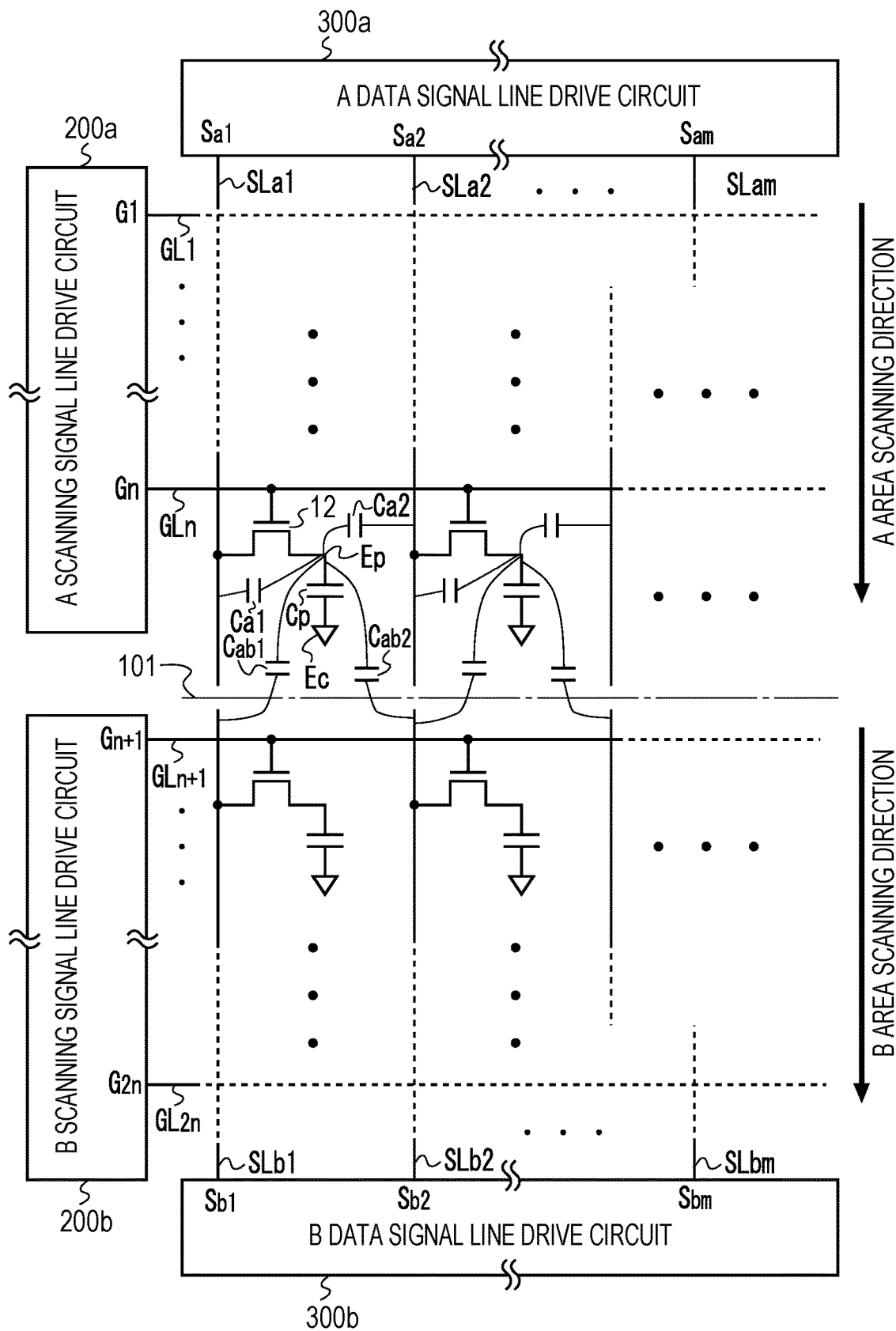
FIG. 10 is a circuit diagram illustrating a configuration associated with the liquid crystal display device for describing an action and effect that are based on a third feature according to the embodiment.

FIG. 10 is a circuit diagram illustrating a configuration associated with the liquid crystal display device for describing the action and effect that are based on a third feature in the present embodiment. In the following, it is assumed that the pixel formation unit 10 in the final line in the A area 100a is referred to as an "A area final-line image formation unit" and that for convenience of description, a focus is placed on the pixel formation unit 10 that corresponds to the A area scanning signal line GLn and the A area data signal line SLa1, as the A area final-line pixel formation unit 10. As illustrated in FIG. 10, as a parasitic capacitance of the A area final-line pixel formation unit 10, a first A parasitic capacitance Ca1 is present between an A area data signal line (hereinafter referred to as a "corresponding A area data signal line") SLa1 to which the source terminal of the TFT 12 is connected and the pixel electrode Ep, a second A parasitic capacitance Ca2 is present between an A area data signal line (hereinafter referred to as an "adjacent A area data signal line") SLa2 which is adjacent to the pixel electrode Ep and to which the source terminal of the TFT 12 is not connected, and the pixel electrode Ep, a first AB parasitic capacitance Cab1 is present between a B area data signal line (hereinafter referred to as a "corresponding B area data signal line") SLb1 that is paired with the corresponding A area data signal line SLa1, and the pixel electrode Ep, and a second AB parasitic capacitance Cab2 is present between a B area data signal line (hereinafter referred to as an "adjacent B area data signal line") SLb2 that is paired with the adjacent A area data signal line SLa2 and the pixel electrode Ep.

At the present time, an operation (hereinafter referred to as an "A area final-line writing operation") that is performed when the pixel voltage is written to the A area final-line pixel formation unit 10 is considered. In the A area final-line writing operation, when the final A area scanning signal line GLn is selected (when the scanning signal Gn is at the H level), a corresponding A area data signal line SLa1 is assigned, as the data signal Sa1, to the pixel electrode Ep through the TFT 12 in an ON state. Thereafter, when the final A area scanning signal line GLn changes to a non-selection state (when the scanning signal Gn changes to the L level), the TFT 12 changes from the On state to an Off state, and thus the A area final-line writing operation is ended. In the A area final-line writing operation, a duration (hereinafter referred to as an "OFF-state duration") from a point in time (hereinafter referred to as a "turning-off point in time") at which the TFT 12 changes from the ON state to the OFF state to a point in time (hereinafter referred to as a "turning-on point in time") at which the TFT 12 changes to the ON state for a next A area final-line writing operation, a pixel voltage of the A area final-line pixel formation unit 10 is influenced by a change (hereinafter referred to as a "corresponding A area voltage change") of ΔVa1 in a voltage of the corresponding A area data signal line SLa1 through the first A parasitic capacitance Ca1, is influenced by a change (hereinafter referred to as an "adjacent A area voltage change") of ΔVa2 in a voltage of the adjacent A area data signal line SLa2 through the second A parasitic capacitance Ca2, is influenced by a change (hereinafter referred to as a "corresponding B area voltage change") of ΔVb1 in a voltage of the corresponding B area data signal line SLb1 through the first AB parasitic capacitance Cab1, and is influenced by a change (hereinafter referred to as an "adjacent B area voltage change") of ΔVb2 in a voltage of the adjacent B area data signal line SLb2 through the second AB parasitic capacitance Cab2.

At this point, "the change of ΔVa1 in the voltage of the corresponding A area data signal line SLa1, the change of ΔVa2 in the voltage of the adjacent A area data signal line SLa2, the change of ΔVb1 in the voltage of the corresponding B area data signal line SLb1, and the change of ΔVb2 in the voltage of the adjacent B area data signal line SLb2 are voltage changes of whose references are a voltage Vsa10 of the corresponding A area data signal line SLa1, a voltage Vsa20 of the adjacent A area data signal line SLa2, a voltage Vsb10 of the corresponding B area data signal line SLb1, and a voltage Vsb20 of the adjacent B area data signal line SLb2, respectively, at the turning-off point in time. For this reason, although any one of a voltage Vsa1 of the corresponding A area data signal line SLa1, a voltage Vsa2 of the adjacent A area data signal line SLa2, voltage Vsb1 of the corresponding B area data signal line SLb1, and a voltage Vsb2 of the adjacent B area data signal line SLb2 changes in the same manner during the OFF-state duration, if, at the turning-on point in time, there are differences among the voltage Vsa10 of the corresponding A area data signal line SLa1, the voltage Vsa20 of the adjacent A area data signal line SLa2, the voltage Vsb10 of the corresponding B area data signal line SLb1, and the voltage Vsb20 of the adjacent B area data signal line SLb2, the change of ΔVa1 in the corresponding A area data signal line, the change of ΔVa2 of the adjacent A area data signal line, the change of ΔVb1 in the corresponding B area data signal line, and the change of ΔVb2 in the adjacent B area data signal line have an influence on a voltage (the pixel voltage) of the pixel electrode Ep in different ways.

The voltage Vsa10 of the corresponding A area data signal line SLa1 and the voltage Vsa20 of the adjacent A area data signal line SLa2 at the turn-off point in time correspond to gradation values (pieces of pixel data), respectively, of two pixels that are adjacent to each other, and, because of this, can be regarded as being substantially equal to each other. However, the voltage Vsa10 of the corresponding A area data signal line SLa1 and the voltage Vsb10 of the corresponding B area data signal line SLb1 at the turning-off point in time correspond to gradation values (pieces of pixel data), respectively, of two pixels that are at positions away from each other, that is, pixel data in the last line in the A area 100a and pixel data in the last line in the B area 100b, and because of this, are greatly different from each other in most cases in the configuration in the related art (Vsa10>>Vsb10 or Vsa10<<Vsb10). In the same manner, the voltage Vsa20 of the adjacent A area data signal line SLa2 and the voltage Vsb20 of the adjacent B area data signal line SLb2 at the turning-off point in time are greatly different from each other in most cases in the configuration in the related art (Vsa20>>Vsb20 or Vsa20<<Vsb20). Incidentally, it is considered that during the OFF-state duration, the pixel formation unit 10 in an area other than the last line in the A area 100a is influenced by the change of ΔVa1 in the voltage of the corresponding A area data signal line and the change of ΔVa2 in the voltage of the adjacent A area data signal line, but is not influenced by the change of ΔVb1 in the voltage of the corresponding B area data signal line and the change of ΔVb2 in the voltage of the adjacent B area data signal line. Therefore, during the OFF-state duration, a data signal line voltage has an influence on the pixel voltage in different ways between the A area final-line pixel formation unit 10 and the pixel formation unit 10 in a line other than the last line in the A area 100a. As a result, a difference in luminance occurs between the A area final-line and the line other than the last line in the A area 100a, and this is visually recognized as the pseudo-line in the border portion (an area in the vicinity of the dividing line 101) of the liquid crystal panel 100.

According to the present embodiment, in order to solve the problems as described above, a configuration is employed in which the display control circuit 400 includes the border portion line data duplication circuit 46 (FIGS. 1 and 3) and in which, instead of the first B area scanning signal GB1 that is illustrated in FIG. 9, the B scanning signal line drive circuit 200b, as illustrated in FIG. 9, generates the second B area scanning signals GB2, as the B area scanning signals Gn+1 to G2n, that temporally precede the first B area scanning signal GB1 by two horizontal durations. Accordingly, as illustrated in FIG. 5, the A area image signal DaA is delayed by the 2H durations (two horizontal duration) with respect to the B area image signal DaB, and data in the last horizontal duration, during each frame duration for the A area image signal DaA is included in a duration that corresponds to the B area image signal DaB. For this reason, during a duration (a duration of selection of the A area scanning signal line GLn) of the A area final-line writing operation, a voltage that is the same as a voltage (a data signal Saj) that is assigned to the A area data signal line SLaj that is paired with the B area data signal line SLbj is assigned, as a B area data signal Sbj, to each B area data signal line SLbj (j=1 to m). Accordingly, during the OFF-state duration, a difference in the influence of the change in the data signal line voltage on the pixel voltage is suppressed between the A area final-line pixel formation unit 10 and the pixel formation unit 10 in the line other than in the last line in the A area 100a. As a result, the difference in luminance does not occur between the A area final-line and the line other than the last line in the A area 100a, and the pseudo-line is suppressed from occurring in the border portion of the liquid crystal panel 100.

According to the present embodiment as described above, in the liquid display device that employs the intra-screen division drive scheme for the purpose of supporting the enhancement in high definition of the display image, based on the third feature, the pseudo-line can be suppressed from occurring in the border portion of the liquid crystal panel 100 and thus an image can be successfully displayed.

<1.4 Effect According to the Present Embodiment>

According to the present embodiment as described above, in the display device in compliance with the intra-screen division drive scheme, the smooth display of the moving image is possible in which the scanning in the reverse direction does not occur in the A area 100a and the B area 100b of the liquid crystal panel 100 (refer to FIGS. 1 and 9), in which the pseudo-line is suppressed from taking place in the border portion of the liquid crystal panel 100 based on the second and third features described above and in which the falling of frames does not take place in the border portion based on the first feature. Accordingly, while suppressing the complication of the circuit configuration, a high-definition image can be successfully displayed by intra-screen division drive in which the preliminary charging scheme is employed.

2. Modification Examples

In the embodiment described above, the display control circuit 400 employs the configuration that is illustrated in FIG. 3 in order to generate the A area image signal DaA and the B area image signal DaB that correspond the first to third features described above, but the present invention is not limited the configuration, and may employ any other configurations in which the A area image signal DaA and the B area image signal DaB, as illustrated in FIGS. 4 and 5, can be generated.

Figure 11:
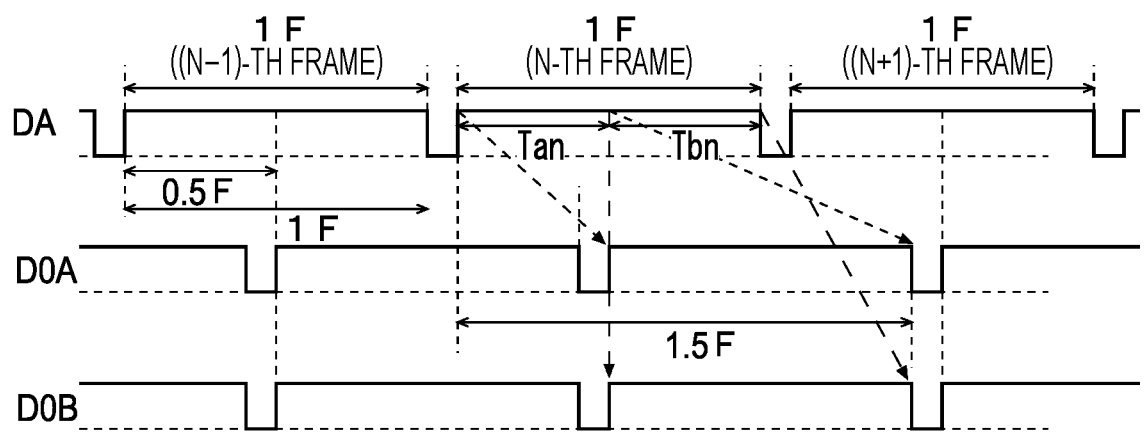
FIG. 11 is a diagram illustrating a signal waveform for describing a configuration of an image signal division circuit in a modification example of the embodiment.

For example, in the image signal division circuit 42 that is a constituent element for involving the first feature in the embodiment described above, a memory (hereinafter referred to as a "first memory") that is used for reading image data at a speed that is half of a writing speed for the intra-screen division drive scheme and a memory (hereinafter referred to as a "second memory") that is used for displaying the B area 100b an image signal that precedes by one frame an image signal which is used for display on the A area 100a of the liquid crystal panel are realized with one 1.5 frame memory 421 (refer to FIGS. 3 and 4). However, two memories may be used instead for the 1.5 frame memory 421 and thus a configuration for the intra-screen division drive and a configuration for the first feature may be separated from each other. That is, the image signal division circuit 42 in the display control circuit 400, as illustrated in FIG. 11, may be configured in such a manner that an image signal DOA for an A area, which is equivalent to an image signal in the first half (Tan) of each frame in the image signal DA and an image signal DOB for an B area, which is equivalent to an image signal in the second half (Tbn) of each frame in the image signal DA, are generated using the first memory and thereafter in such a manner that an image signal that is equivalent to the A area image signal DaA and the B area image signal DaB in the present embodiment is generated based on delay image signal that results from delaying the image signal DOB for the B area by one frame duration, using the image signal DOA for the A area and the second memory.

Furthermore, in the embodiment described above, in the Np line duplication delay circuit 44 that is a constituent element for realizing suitable preliminary charging in compliance with the intra-screen division drive scheme, a numerical value Np that indicating a time interval between the preliminary charging duration and a primary charging duration that corresponds to the preliminary charging duration is "4", but the numerical value Np may be a natural number other than "4". However, in the liquid crystal display device that performs line reversal drive, there is a need to set the numerical value Np to be a number. This is because regarding each subsidiary data signal line SLxj, a polarity of data signal Sxj that is applied during the preliminary charging duration is caused to agree with a voltage polarity of a data signal Sxj that is applied during the primary charging duration (x=a, b; j=1 to m).

The embodiment as described above has as the third feature a configuration in which a B area scanning signal GB2 (Gn+1 to G2n) as illustrated in FIG. 9, is caused to precede an A area scanning signal GA1 (G1 to Gn) by two horizontal durations is as scanning signals Gn+1 to G2n for the B area 100b of the liquid crystal panel, and in which the B area image signal DaB, as illustrated in FIG. 5, is caused to precede the A area image signal DaA by two horizontal durations. At this point, the purpose of causing the B area scanning signal GB2 and the B area image signal DaB to precede the A area scanning signal GA1 and the A area image signal DaA by two horizontal durations is to cause the data signals Saj and Sbj that are assigned to the A area data signal line SLaj and the B area data signal line SLbj, respectively, to be equal in voltage and voltage polarity to each other during a duration of selection of the last A area scanning signal line GLn while the line reversal operation is in progress in the liquid crystal display device. Therefore, the expression "two horizontal durations" here may be changed to any other value that complies with a reversal drive scheme.

Furthermore, the embodiment described has all the first to third features described above, but may be configured to have only one of the three features or may be configured to have only two of the three features. It is noted that, in the display control circuit 400, the image signal division circuit without the frame delay is used instead of the image signal division circuit 42 that is illustrated in FIGS. 3 and 4, that is, the image signal division circuit 42 with the frame delay, in the case of the configuration in which the first feature is not involved, that the Np line duplication delay circuit 44 is unnecessary in the case of the configuration in which the second feature is not involved, and that the border portion line data duplication circuit 46 is unnecessary in the case of the configuration the third feature is not involved. Furthermore, in a case where the A scanning signal line drive circuit 200a and the B scanning signal line drive circuit 200b, as well as the display control circuit 400, do not have the third feature, among the three features described above, configuration is performed in such a manner that the A area scanning signal GA1 and the first B area scanning signal GB1 which are illustrated in FIG. 9 are not generated. In a case where the preliminary charging scheme is not employed such as in a case where the second feature is not involved, configuration is performed in such a manner that a scanning signal, from which a pulse (a pulse that is surrounded by a broken line in FIG. 9) for the preliminary charging in the A area scanning signal GA1 and the first or second B area scanning signal GB1 or GB2 that are illustrated in FIG. 9 is removed, is generated. For example, in a case where the third feature is involved, but the second feature is not involved, the scanning signals G1 to G2n are generated, each of which is made up of a signal from which the pulse for the preliminary charging in the A area scanning signal GA1 that is illustrated in FIG. 9 and a signal from which the pulse for the preliminary charging in the second B area scanning signal GB2 that is illustrated in FIG. 9.

Furthermore, in the present embodiment, scanning signal lines GL1 to GL2n in the liquid crystal panel 100 are grouped into two sets of scanning signal line groups, the A area scanning signal lines GL1 to GLn and the B area scanning signal lines GLn+1 to GL2n. A configuration is accordingly employed in each data signal line SLj is electrically separated into the A area data signal line SLaj that intersects the A area scanning signal lines GL1 to GLn and the B area data signal line SLbj that intersects the B area scanning signal lines GLn+1 to GL2n. That is, a configuration is employed that corresponds to the intra-screen division drive scheme in which the number of divisions is 2 (refer to FIG. 1). However, the present invention is not limited to this, and a configuration may be employed that corresponds to an intra-screen division drive scheme in which the number of divisions is equal to or greater than 3. In this case, the data signal line drive circuit and the scanning signal line drive circuit are configured in such a manner that areas of which the number is equivalent to the number of divisions in the liquid crystal panel 100 are scanned in parallel in the same direction and are driven, and the display control circuit 400 is configured in such a manner as to involve features that are the same as at least the second and third features in the embodiment described above.

The present invention is described above with the liquid crystal display device being given as an example thereof, but it is also possible that the present invention finds application in display devices other than the liquid display device, which include any display devices that are active matrix type display devices, each employing the screen internal-division scheme, for example, in organic EL display devices. A high-definition image can also be successfully displayed, by the screen internal-division drive, on a liquid crystal display device according to the present invention other than the liquid crystal display device, while suppressing the complication of the circuit configuration.

3. Others

The present international application claims the benefits of Japanese Patent Application No. 2016-146999 filed on Jul. 27, 2016, titled "DISPLAY DEVICE AND METHOD OF DRIVING DISPLAY DEVICE," the entire contents of which are incorporated herein by reference.

4. Appendix

There is provided a display device that includes a plurality of data signal lines, a plurality of scanning signal lines that intersect the plurality of data signal lines and a plurality of pixel formation units that are positioned in a matrix form in a manner that corresponds to the plurality of data signal lines and the plurality of scanning signal lines, the device including:

a scanning signal line drive circuit that divides the plurality of scanning signal lines into two or more sets of scanning signal line groups, a set including a predetermined number of scanning signal lines, and that drives the two or more sets of scanning signal line groups in parallel such that the scanning signal lines that constitute each set are sequentially selected in an identical direction;

a data signal line drive circuit that applies a plurality of data signals which represent an image that is to be displayed, to the plurality of data signal lines, respectively; and a display control circuit that controls the scanning signal line drive circuit and the data signal line drive circuit such that the plurality of data signals are applied to the plurality of data signal lines in accordance with the sequential selection of the scanning signal lines that constitute each set, in which each data signal line is electrically separated into two or more subsidiary data signal lines that each intersect the two or more sets of scanning signal line groups such that a portion of the data signal line, which intersects one set of scanning signal line group, constitutes the subsidiary data signal line as one conductor, in which each pixel formation unit includes a capacitance element, to which a voltage of a data signal which is applied to a corresponding subsidiary data signal line when a corresponding scanning signal line is selected is applied, and which retains the applied voltage as pixel data, in which, in a preliminary charging duration that is set in advance as a duration which precedes a primary charging in which a corresponding scanning signal line is selected in order to assign the pixel data to each image formation unit, before the corresponding scanning signal line is selected and a scanning signal line that is to be selected latest among each set of scanning signal line group is selected, the display control circuit controls the scanning signal line drive circuit such that sequential selection of scanning signal line groups in a set that succeeds the set is ended, and in which, the display control unit controls the data signal line drive circuit such that, according to parallel driving of the two or more sets of scanning signal line groups, the plurality of data signal lines are driven independently for every subsidiary data signal line that intersects the scanning signal line groups in the same set, and such that a voltage, which is to be applied, as a data signal, to each subsidiary data signal line, in a primary charging duration for the scanning signal line for which a preliminary charging duration is set earlier than the primary charging duration for a scanning signal line that is to be selected earliest among each set of the scanning signal line group, is also applied in the preliminary charging duration.

There is provided a method of driving a display device that includes a plurality of data signal lines, a plurality of scanning signal lines that intersect the plurality of data signal lines and a plurality of pixel formation units that are positioned in a matrix form in a manner that corresponds to the plurality of data signal lines and the plurality of scanning signal lines, the method including:

a scanning signal line drive step of dividing the plurality of scanning signal lines into two or more sets of scanning signal line groups, a set including a predetermined number of scanning signal lines, and of driving the two or more sets of scanning signal line groups in parallel such that the scanning signal lines that constitute each set are sequentially selected in an identical direction; and a data signal line drive step of driving the plurality of data signal lines such that a plurality of data signals that represent an image that is to be displayed are applied to the plurality of data signal lines in accordance with the sequential selection of the scanning signal lines that constitute each set;

in which each data signal line is electrically separated into two or more subsidiary data signal lines that each intersect the two or more sets of scanning signal line groups such that a portion of the data signal line, which intersects one set of scanning signal line group, constitutes the subsidiary data signal line as one conductor, in which each pixel formation unit includes a capacitance element, to which a voltage of a data signal which is applied to a corresponding subsidiary data signal line when a corresponding scanning signal line is selected is applied, and which retains the applied voltage as pixel data, in which the scanning signal line drive step includes a step of selecting a corresponding scanning signal line in a preliminary charging duration that is set in advance as a duration that precedes a primary charging duration in which the corresponding scanning signal line is selected in order to assign the pixel data to each pixel formation unit, and in which the data signal line drive step includes a step in which the voltage of the data signal, which is to be applied each subsidiary data signal line, in the primary charging duration for the scanning signal line for which the preliminary charging duration is set earlier than the primary charging duration for a scanning signal line that is to be selected earliest among each set of the scanning signal line group, is also applied in the preliminary charging duration.

REFERENCE SIGNS LIST

100 LIQUID CRYSTAL PANEL (DISPLAY PANEL)
100a A AREA (OF LIQUID CRYSTAL PANEL)
100b B AREA (OF LIQUID CRYSTAL PANEL)
10 PIXEL FORMATION UNIT
12 THIN FILM TRANSISTOR (SWITCHING ELEMENT)
200a A SCANNING SIGNAL LINE DRIVE CIRCUIT

200b B SCANNING SIGNAL LINE DRIVE CIRCUIT
300a A DATA SIGNAL LINE DRIVE CIRCUIT
300b B DATA SIGNAL LINE DRIVE CIRCUIT
400 DISPLAY CONTROL CIRCUIT
42 IMAGE SIGNAL DIVISION CIRCUIT
44 Np LINE DUPLICATION DELAY CIRCUIT
46 BORDER PORTION LINE DATA DUPLICATION CIRCUIT
GL1 TO GLn A AREA SCANNING SIGNAL LINE (PRECEDING SCANNING SIGNAL LINE GROUP)
GLn+1 TO GL2n B AREA SCANNING SIGNAL LINE (FOLLOWING SCANNING SIGNAL LINE GROUP)
SLa1 TO SLam A AREA DATA SIGNAL LINE (SUBSIDIARY DATA SIGNAL LINE)
SLb1 TO SLbm B AREA DATA SIGNAL LINE (SUBSIDIARY DATA SIGNAL LINE)
G1 to Gn A AREA SCANNING SIGNAL
Gn+1 TO G2n B AREA SCANNING SIGNAL
Sa1 TO Sam A AREA DATA SIGNAL
Sb1 TO Sbm B AREA DATA SIGNAL
DaA A AREA IMAGE SIGNAL
DaB B AREA IMAGE SIGNAL
CgA A AREA SCANNING SIDE CONTROL SIGNAL
CgB B AREA SCANNING SIDE CONTROL SIGNAL
CsA A AREA DATA SIDE CONTROL SIGNAL
CsB B AREA DATA SIDE CONTROL SIGNAL
Ep PIXEL ELECTRODE
Cp PIXEL CAPACITANCE
Ca1, Ca2, Cab1, Cab2 PARASITIC CAPACITANCE

The invention claimed is:

1. A display device that includes a plurality of data signal lines, a plurality of scanning signal lines that intersect the plurality of data signal lines, respectively, and a plurality of pixel formation units that are positioned in a matrix form in a manner that corresponds to the plurality of data signal lines and the plurality of scanning signal lines, the device comprising:
   a scanning signal line drive circuit that divides the plurality of scanning signal lines into two or more sets of scanning signal line groups, a set including a predetermined number of scanning signal lines, and that drives the two or more sets of scanning signal line groups in parallel such that the scanning signal lines that constitute each set are sequentially selected in an identical direction;
   a data signal line drive circuit that applies a plurality of data signals which represent an image that is to be displayed, to the plurality of data signal lines; and
   a display control circuit that controls the scanning signal line drive circuit and the data signal line drive circuit such that the plurality of data signals are applied to the plurality of data signal lines in accordance with the sequential selection of the scanning signal lines that constitute each set,
   wherein each data signal line is electrically separated into two or more subsidiary data signal lines that each intersect the two or more sets of scanning signal line groups such that a portion of the data signal line, which intersects one set of scanning signal line group, constitutes the subsidiary data signal line as one conductor,
   wherein, before a scanning signal line that is to be selected latest among each set of the scanning signal line group is selected, the display control circuit controls the scanning signal line drive circuit such that sequential selection of scanning signal line groups in a set that succeeds the set is ended, and
   wherein, when, in accordance with parallel driving of the two or more sets of scanning signal line groups, the plurality of data signal lines are driven independently for every subsidiary data signal line that intersects a scanning signal line group in an identical set and the scanning signal line that is to be selected latest among each set of the scanning signal line group is selected, the display control circuit controls the data signal line drive circuit such that a voltage which is as high as a voltage of a data signal, which is applied to the subsidiary data signal line that intersects the set of the scanning signal line group, is applied to each of the subsidiary data signal lines that intersect the scanning signal line groups in the set that succeeds the set.

2. The display device according to claim 1,
   wherein each pixel formation unit includes a capacitance element, to which a voltage of a data signal which is applied to a corresponding subsidiary data signal line when a corresponding scanning signal line is selected is applied, and which retains the applied voltage as pixel data,
   wherein the display control circuit controls the scanning signal line drive circuit such that a corresponding scanning signal line is selected in a preliminary charging duration that is set in advance as a duration that precedes a primary charging duration in which the corresponding scanning signal line is selected in order to assign the pixel data to each pixel formation unit, and
   wherein the display control circuit controls the data signal line drive circuit such that a voltage, which is to be applied, as a data signal, to each subsidiary data signal line in the primary charging duration for the scanning signal line, for which the preliminary charging duration is set earlier than the primary charging duration for a scanning signal line that is to be selected earliest among each set of the scanning signal line group, is also applied in the preliminary charging duration.

3. The display device according to claim 1,
   wherein the plurality of scanning signal lines are made up of two sets of a preceding scanning signal line group and a succeeding scanning signal line group,
   wherein the data signal line drive circuit includes
     a preceding data signal line drive circuit that drives a subsidiary data signal line which intersects the preceding scanning signal line group, among the subsidiary data signal lines that are included in the plurality of data signal lines, and
     a succeeding data signal line drive circuit that drives a subsidiary data signal line which intersects the succeeding scanning signal line group, among the subsidiary data signal lines that are included in the plurality of data signal lines,
   wherein the display control circuit causes the preceding data signal line drive circuit to generate a data signal that is to be applied to the subsidiary data signal line which intersects the preceding scanning signal line group, based on image data in a first half of each frame in an input signal that is assigned, as a signal representing the image that is to be displayed, from an outside, and
   wherein the display control circuit causes the succeeding data signal line drive circuit to generate a data signal that is to be applied to the subsidiary data signal line which intersects the succeeding scanning signal line group, based on image data in a second half of a frame that immediately precedes a frame for the input signal which corresponds to the data signal that is to be applied to the subsidiary data signal line which intersects the preceding scanning signal line group.

4. The display device according to claim 3, wherein the display control circuit includes
   a memory storable image data for one and a half frames, of an input signal, and
   a memory control circuit that writes image data that is indicated by the input signal, to the memory such that the memory functions as a ring buffer,
   wherein the memory control circuit reads image data that is equivalent to the first half of one frame for the input signal, at a speed that is half of a writing speed, from the memory, and supplies the image data to the preceding data signal line drive circuit, and
   wherein, concurrently with the reading of the image data equivalent to the first half of the one frame from the memory, the memory control circuit reads image data that is equivalent to the second half of a frame that immediately precedes the one frame, at the speed that is half of the writing speed from the memory, and supplies the image data to the succeeding data signal line drive circuit.

5. A method of driving a display device that includes a plurality of data signal lines, a plurality of scanning signal lines that intersect the plurality of data signal lines and a plurality of pixel formation units that are positioned in a matrix form in a manner that corresponds to the plurality of data signal lines and the plurality of scanning signal lines, the method comprising:
   a scanning signal line drive step of dividing the plurality of scanning signal lines into two or more sets of scanning signal line groups, a set including a predetermined number of scanning signal lines, and of driving the two or more sets of scanning signal line groups in parallel such that the scanning signal lines that constitute each set are sequentially selected in an identical direction; and
   a data signal line drive step of driving the plurality of data signal lines such that a plurality of data signals that represent an image that is to be displayed are applied to the plurality of data signal lines in accordance with the sequential selection of the scanning signal lines that constitute each set,
   wherein each data signal line is electrically separated into two or more subsidiary data signal lines that each intersect the two or more sets of scanning signal line groups such that a portion of the data signal line, which intersects one set of scanning signal line group, constitutes the subsidiary data signal line as one conductor,
   wherein, in the scanning signal line drive step, before a scanning signal line that is to be selected latest among each set of the scanning signal line group is selected, the plurality of scanning signal lines are driven such that sequential selection of scanning signal line groups in a set that succeeds the set is ended, and
   wherein, in the data signal line drive step, when, in accordance with parallel driving of the two or more sets of scanning signal line groups, the plurality of data signal lines are driven independently for every subsidiary data signal line that intersects a scanning signal line group in an identical set and the scanning signal line that is to be selected latest among each set of the scanning signal line group is selected, a voltage which is as high as a voltage of a data signal, which is applied to the subsidiary data signal line that intersects the set of the scanning signal line group, is applied to each of the subsidiary data signal lines that intersect the scanning signal line groups in the set that succeeds the set.

6. The method according to claim 5, wherein each pixel formation unit includes a capacitance element, to which a voltage of a data signal which is applied to a corresponding subsidiary data signal line when a corresponding scanning signal line is selected is applied, and which retains the applied voltage as pixel data,
   wherein the scanning signal line drive step includes a step of selecting a corresponding scanning signal line in a preliminary charging duration that is set in advance as a duration that precedes a primary charging duration in which the corresponding scanning signal line is selected in order to assign the pixel data to each pixel formation unit, and
   wherein the data signal line drive step includes a step in which a voltage, which is to be applied, as a data signal, to each subsidiary data signal line, in the primary charging duration for the scanning signal line for which the preliminary charging duration is set earlier than the primary charging duration for a scanning signal line that is to be selected earliest among each set of the scanning signal line group, is also applied in the preliminary charging duration.

7. The method according to claim 5, wherein the plurality of scanning signal lines are made up of two sets of a preceding scanning signal line group and a succeeding scanning signal line group,
   wherein the data signal line drive step includes
      a preceding data signal line drive step of driving a subsidiary data signal line which intersects the preceding scanning signal line group, among the subsidiary data signal lines that are included in the plurality of data signal lines, and
      a succeeding data signal line drive step of driving a subsidiary data signal line which intersects the succeeding scanning signal line group, among the subsidiary data signal lines that are included in the plurality of data signal lines,
   wherein, in the preceding data signal line drive step, a data signal that is to be applied to each subsidiary data signal line which intersects the preceding scanning signal line group is generated based on image data in a first half of each frame in an input signal that is assigned, as a signal representing the image that is to be displayed, from an outside, and
   wherein, in the succeeding data signal line drive step, a data signal that is to be applied to each subsidiary data signal line which intersects the succeeding scanning signal line group is generated based on image data in a second half of a frame that immediately precedes a frame for the input signal which corresponds to the data signal that is applied to each subsidiary data signal line which intersects the preceding scanning signal line group.

* * * * *